July 19, 1932. J. E. WAHL ET AL 1,867,932
MEANS FOR MAKING PEN NIBS
Filed April 13, 1927 20 Sheets-Sheet 16
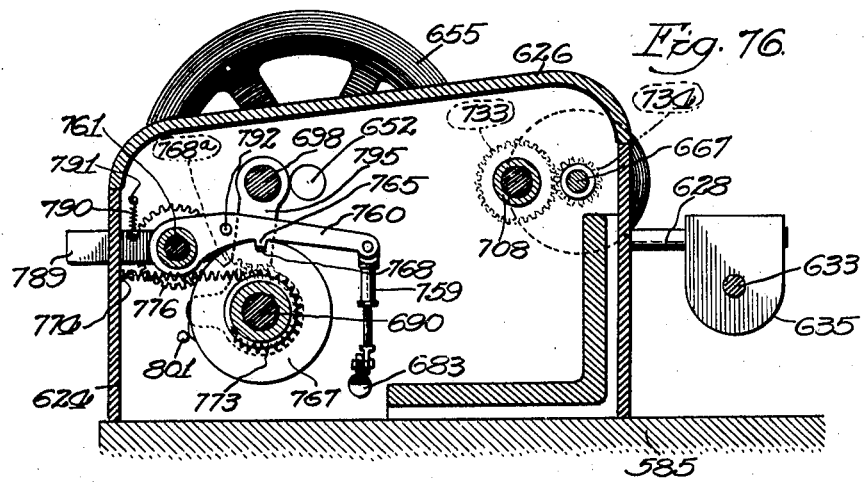
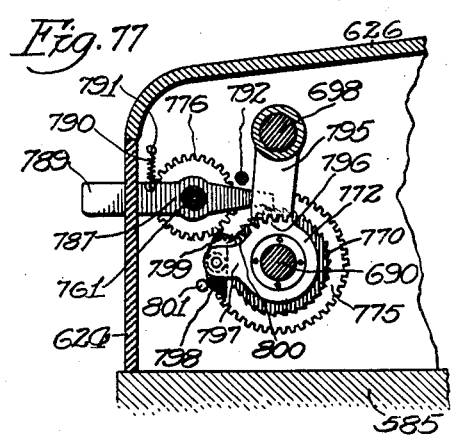
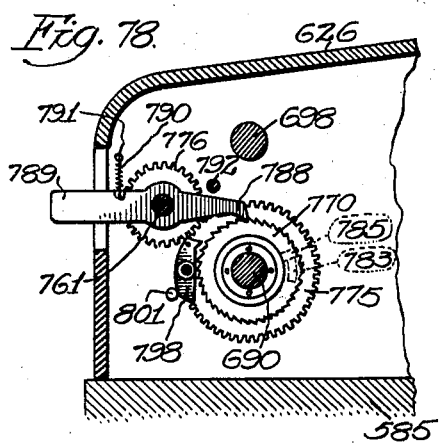
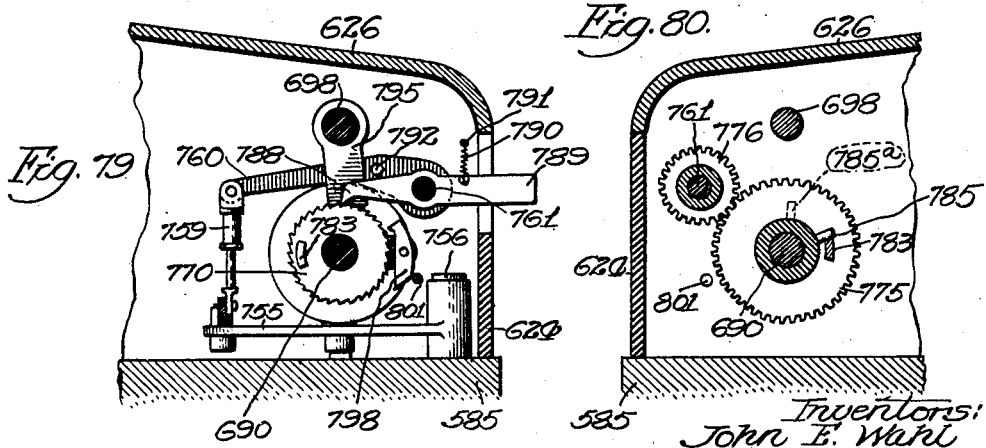
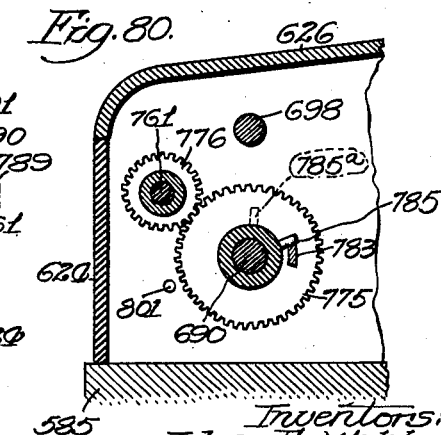

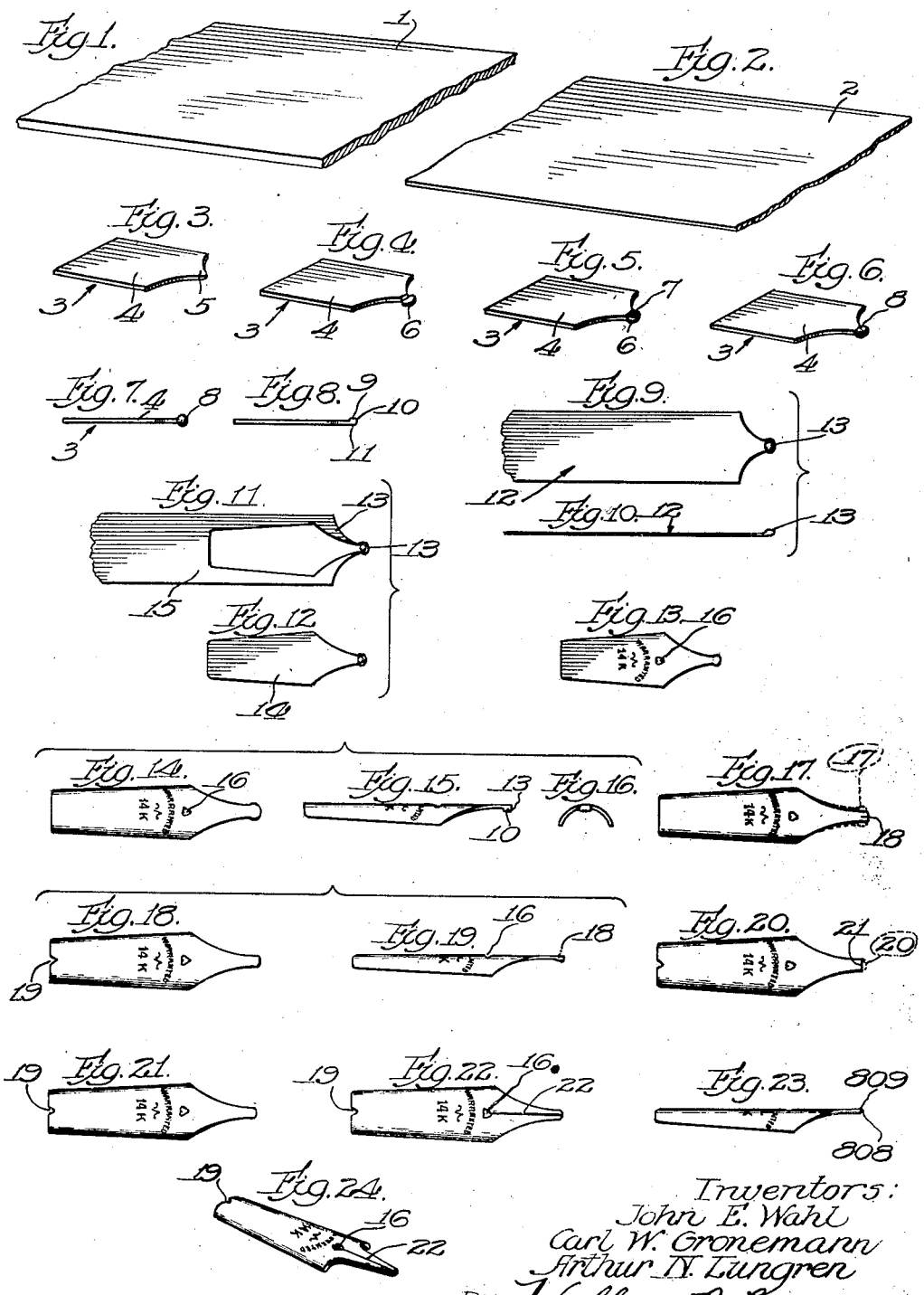

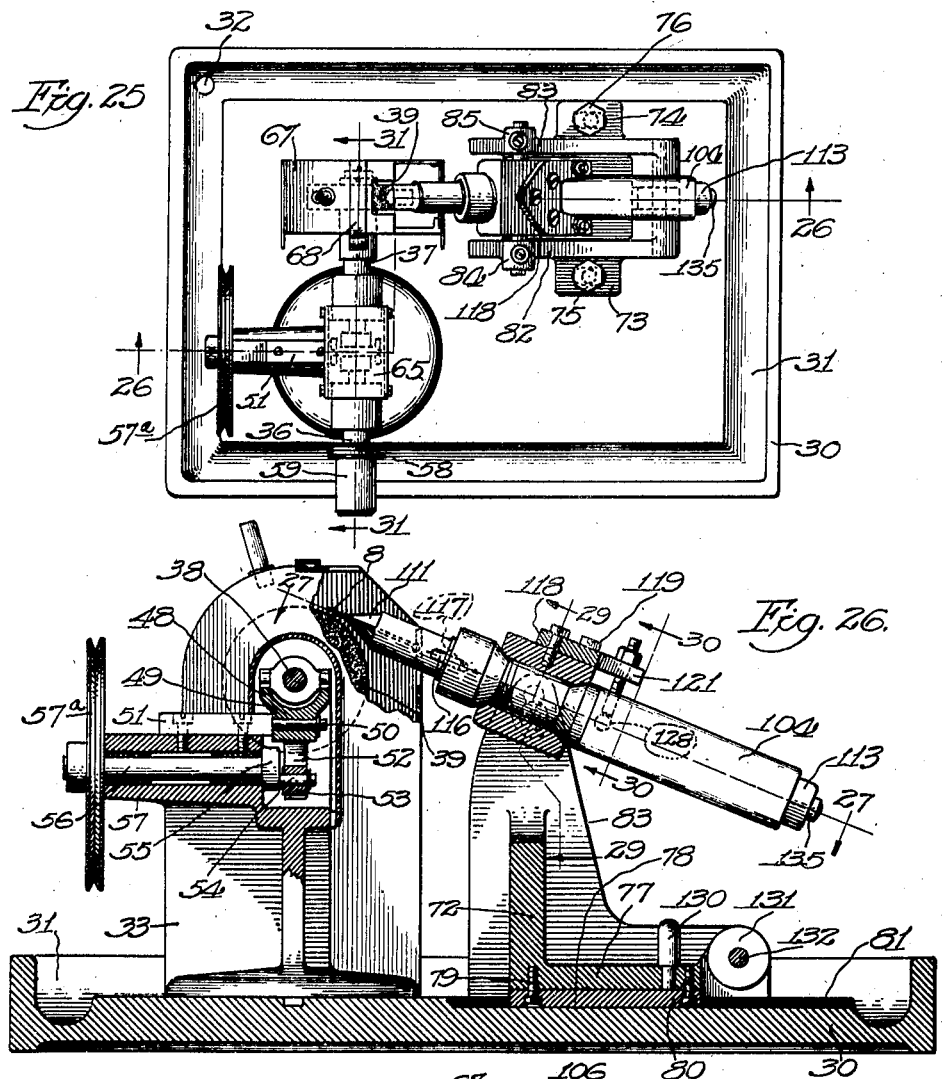

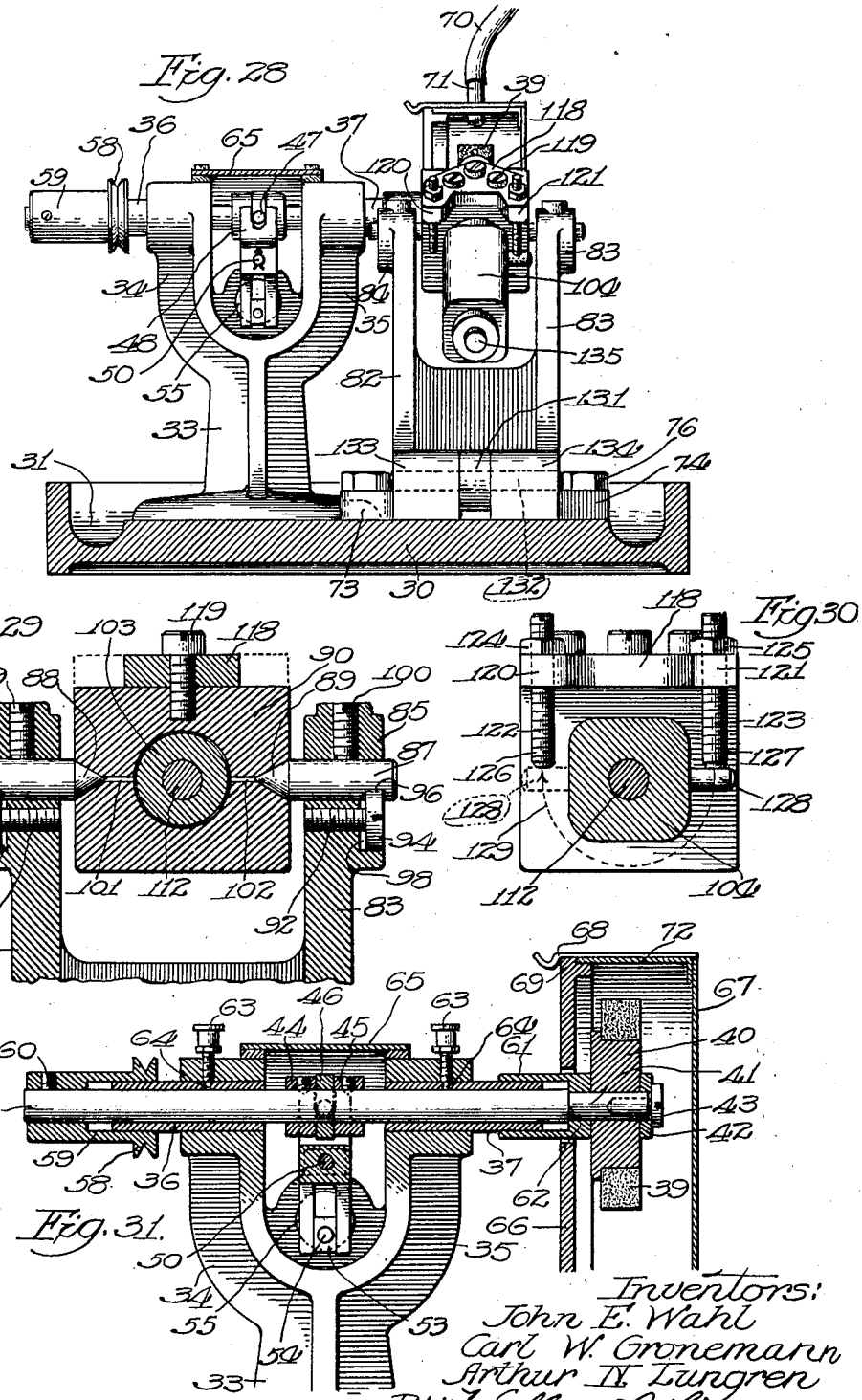

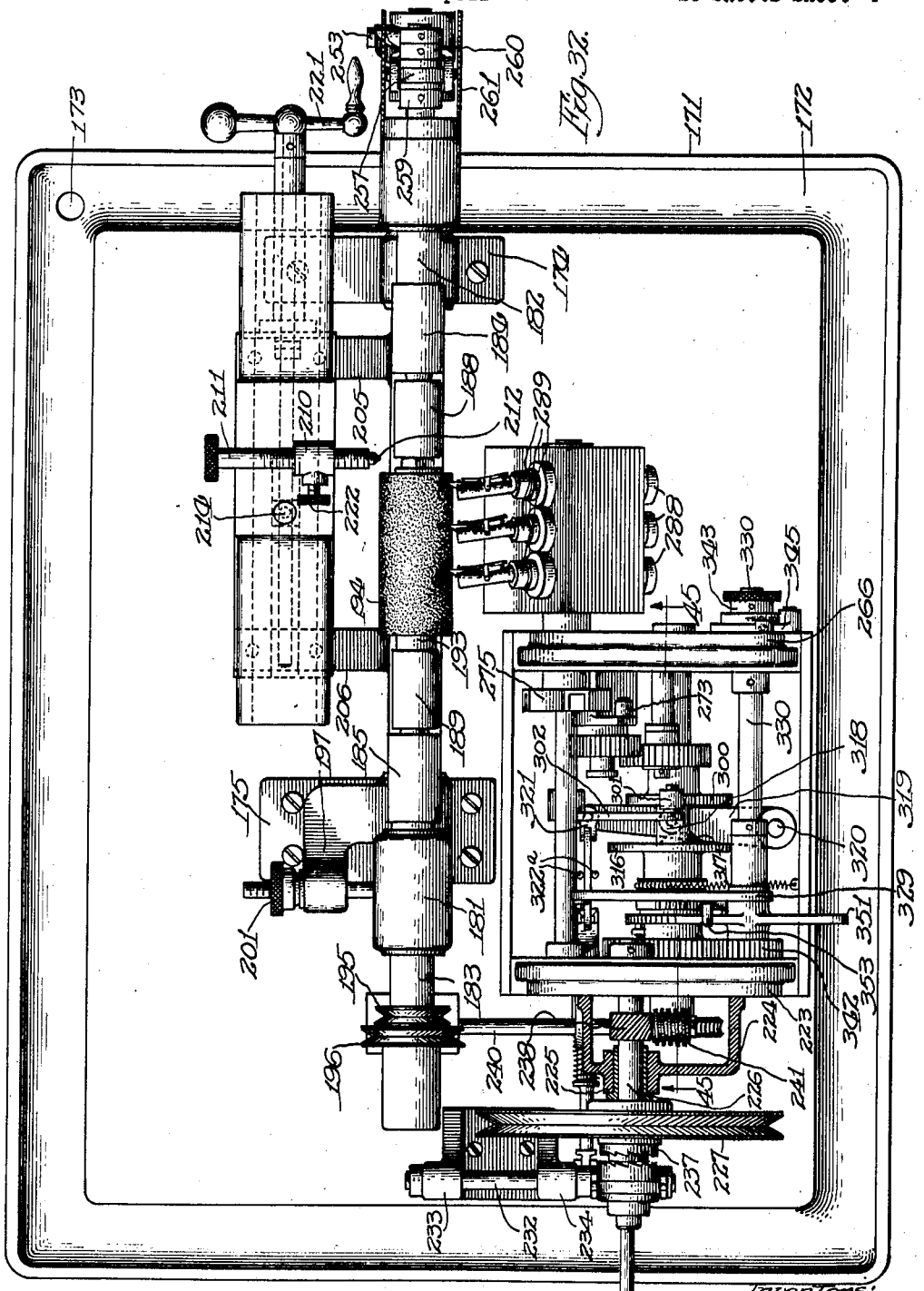

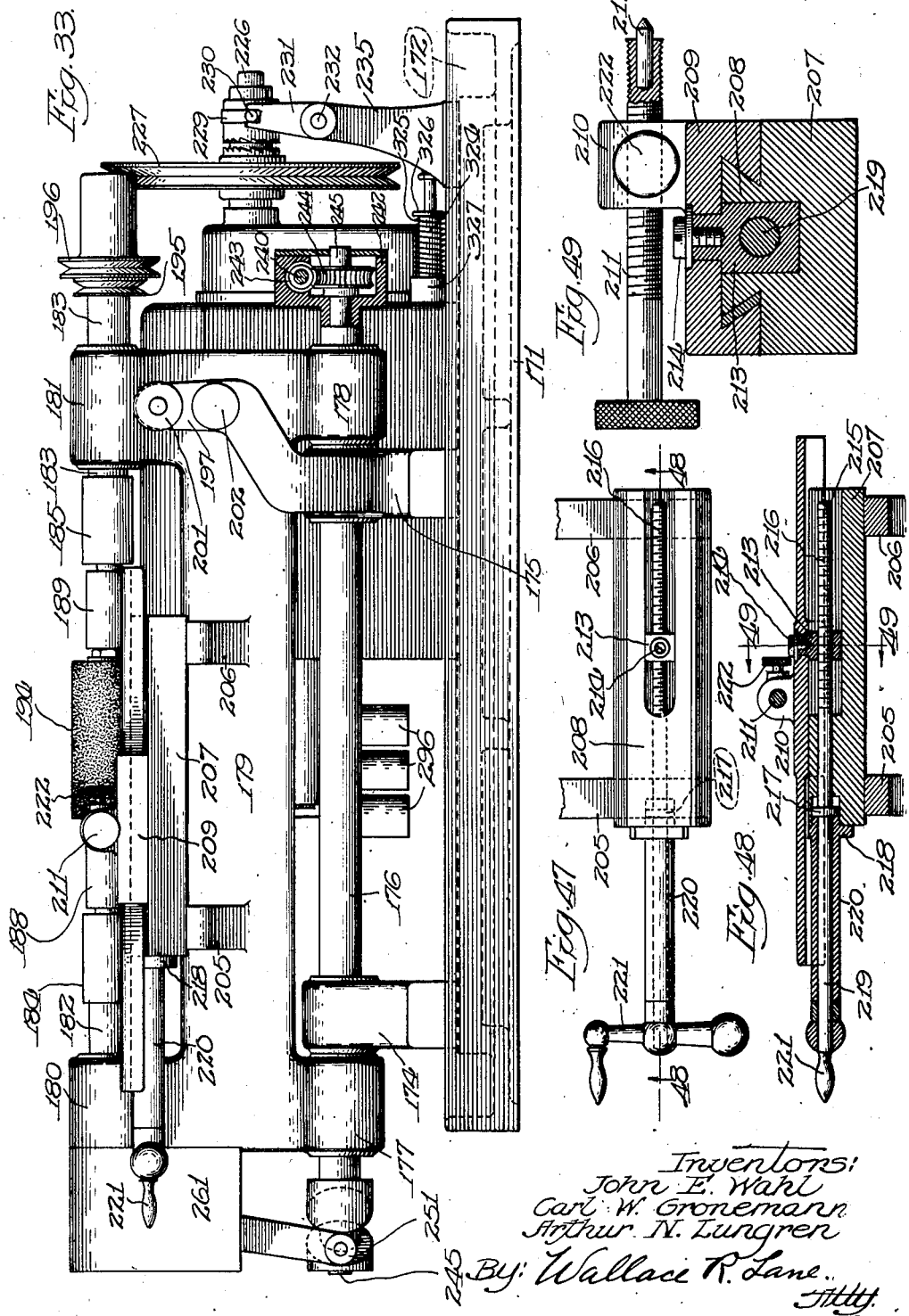

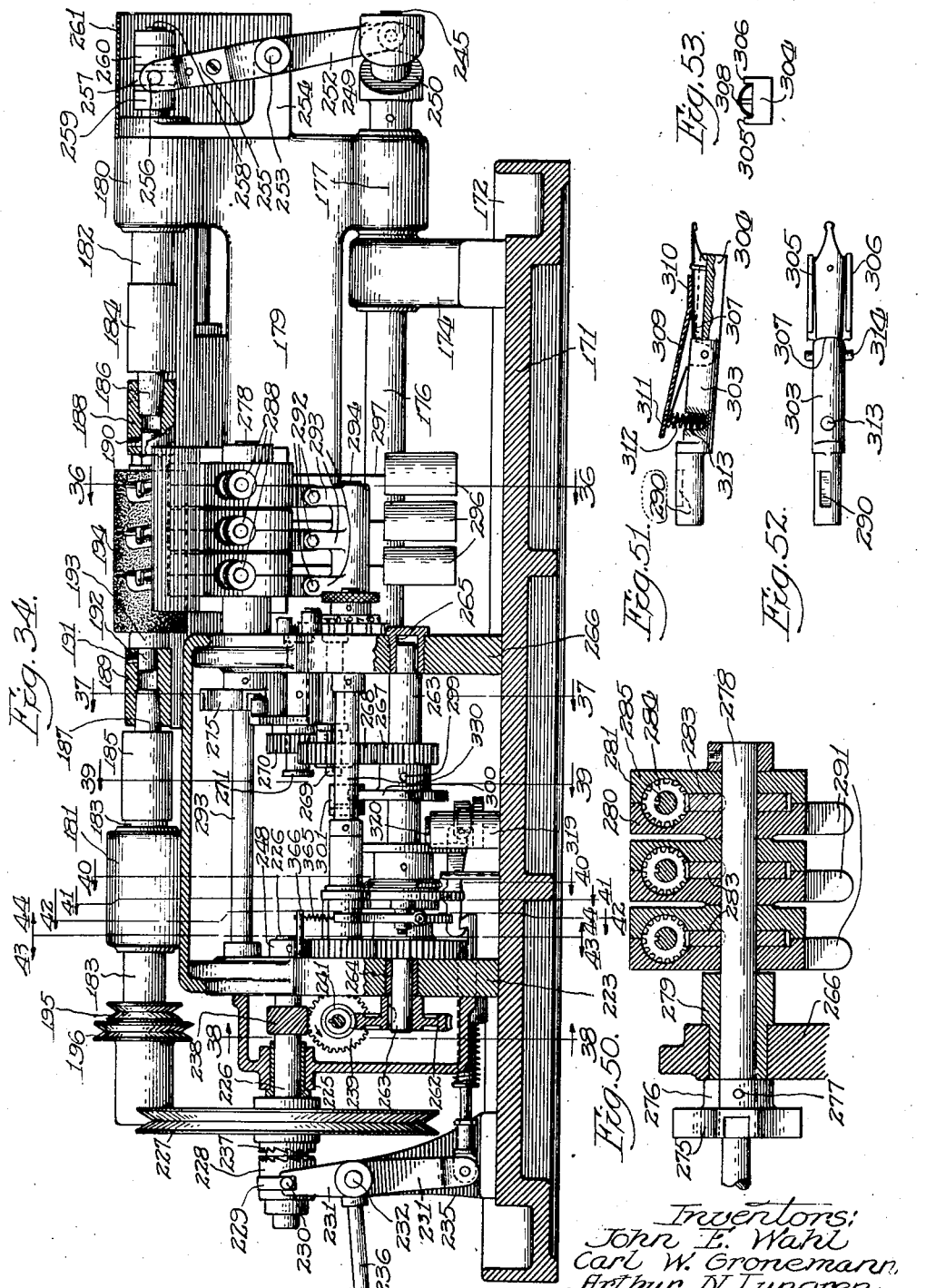

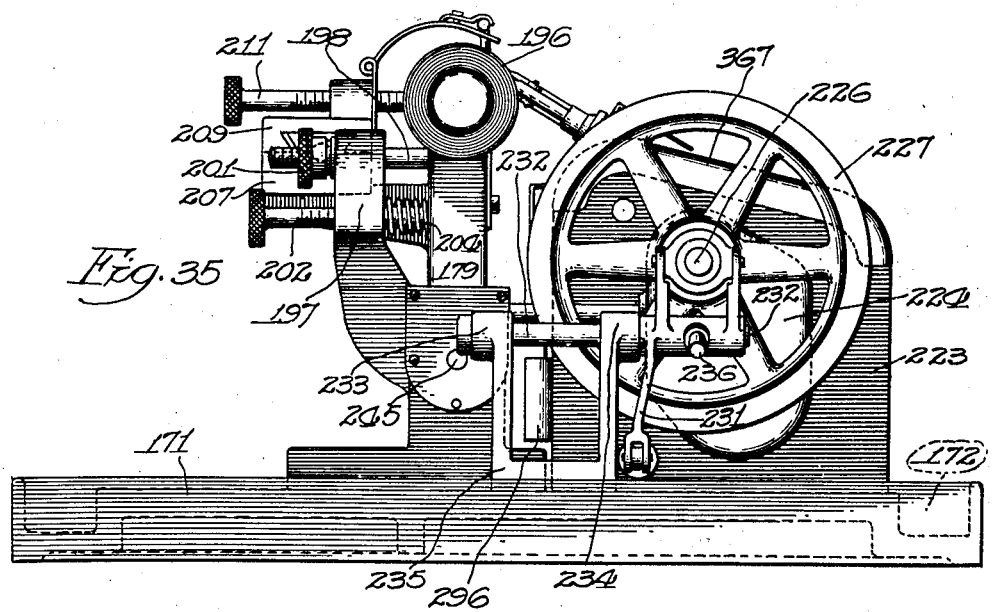
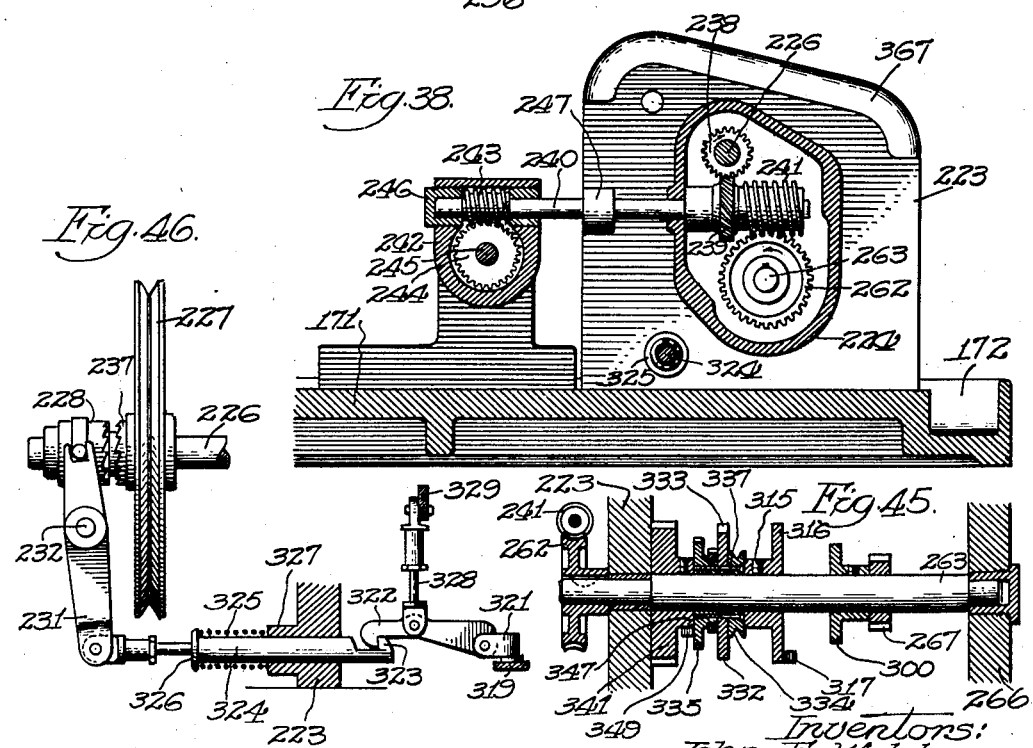

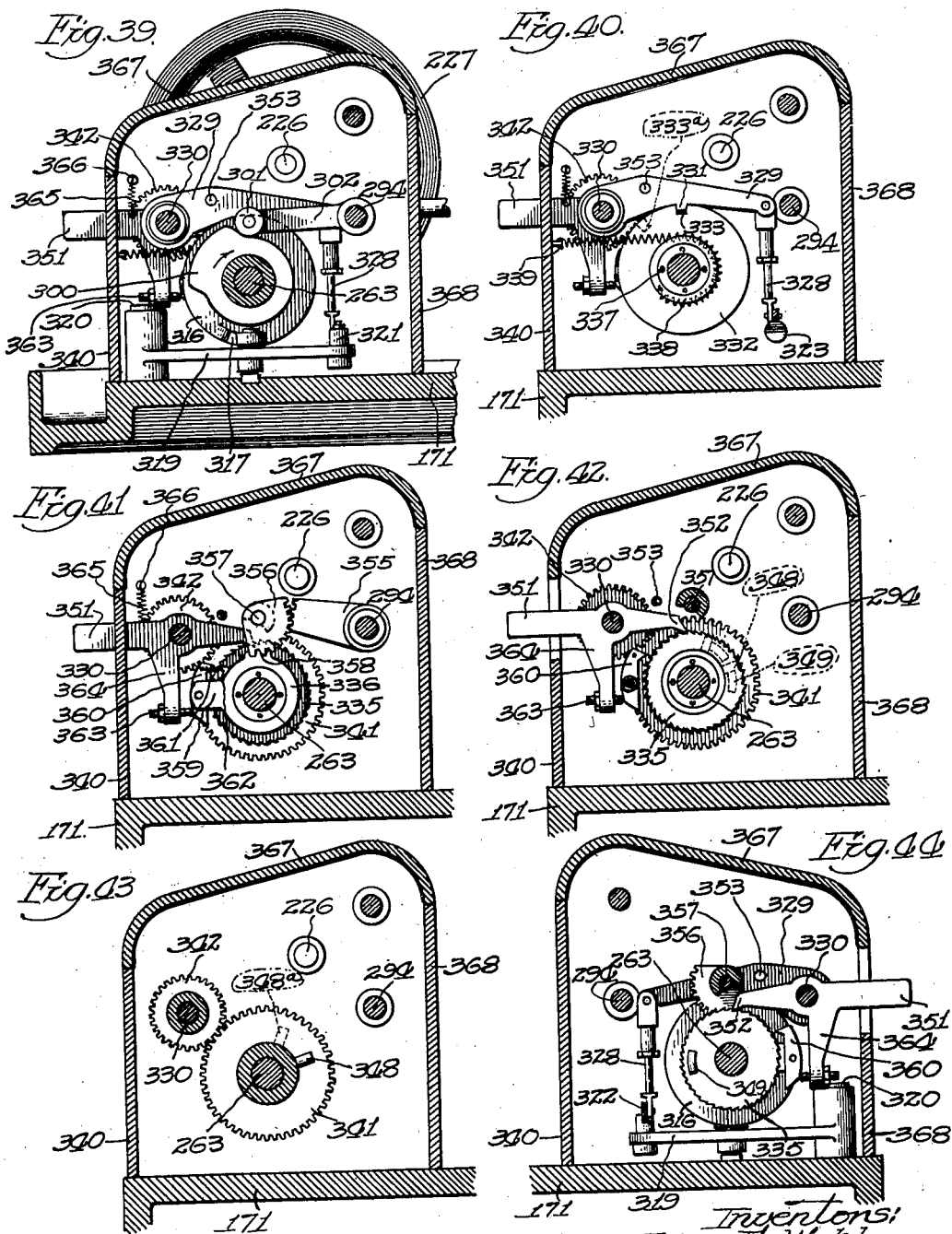

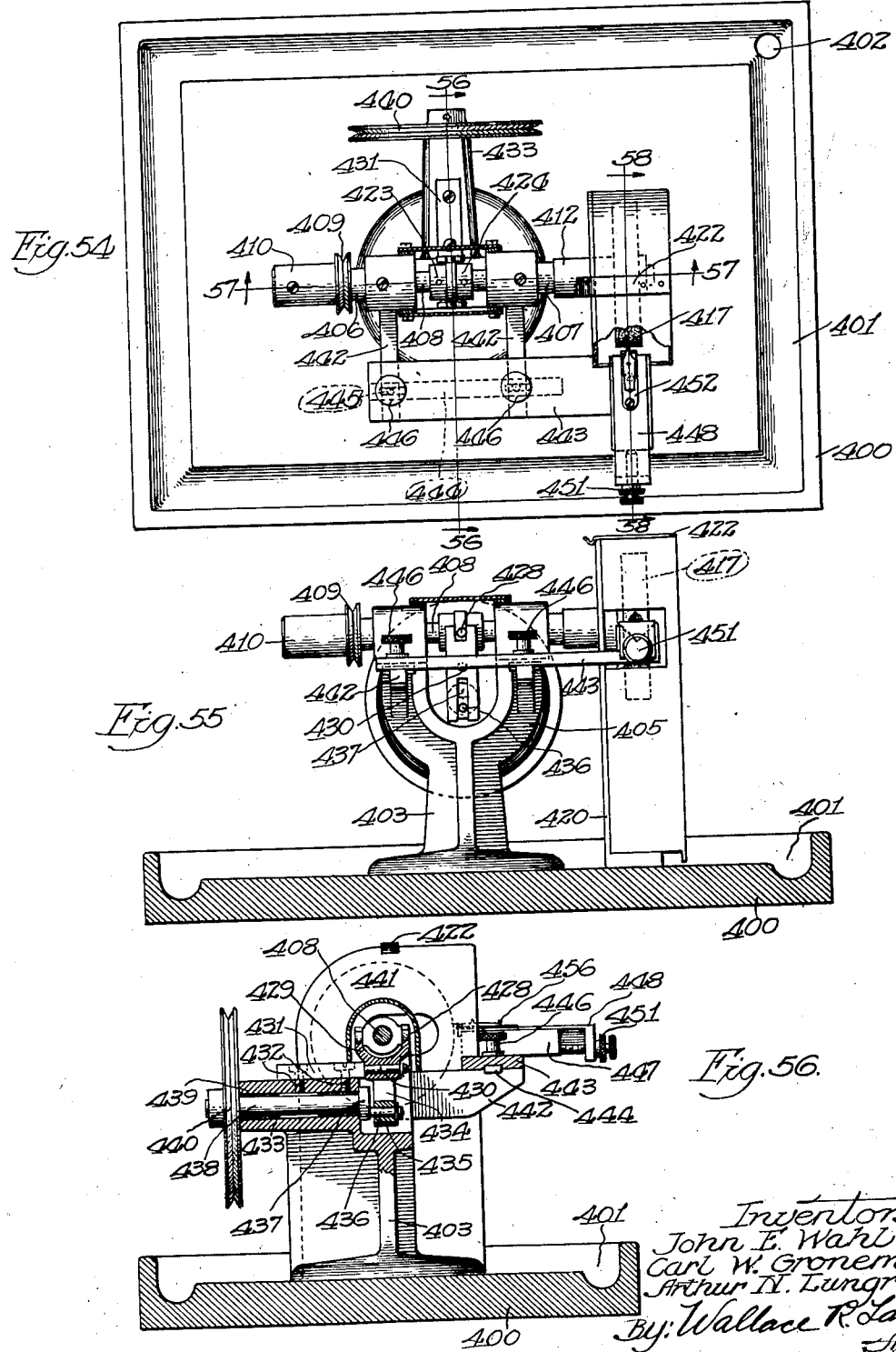

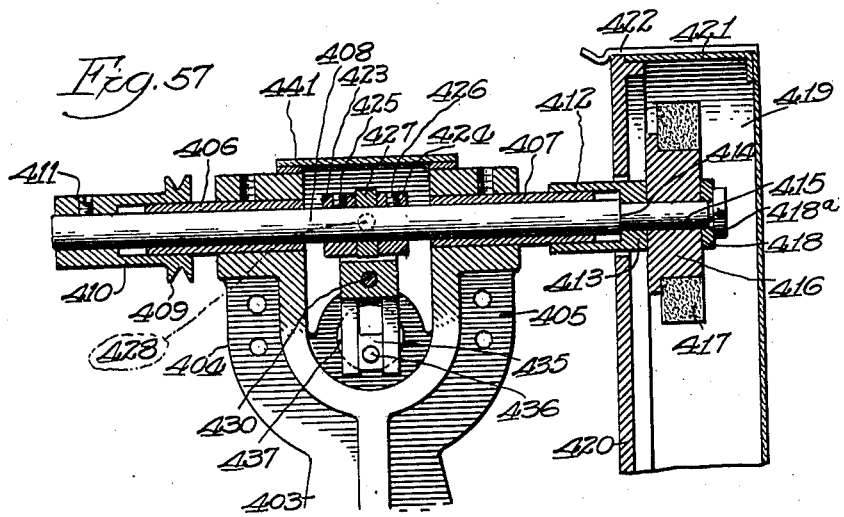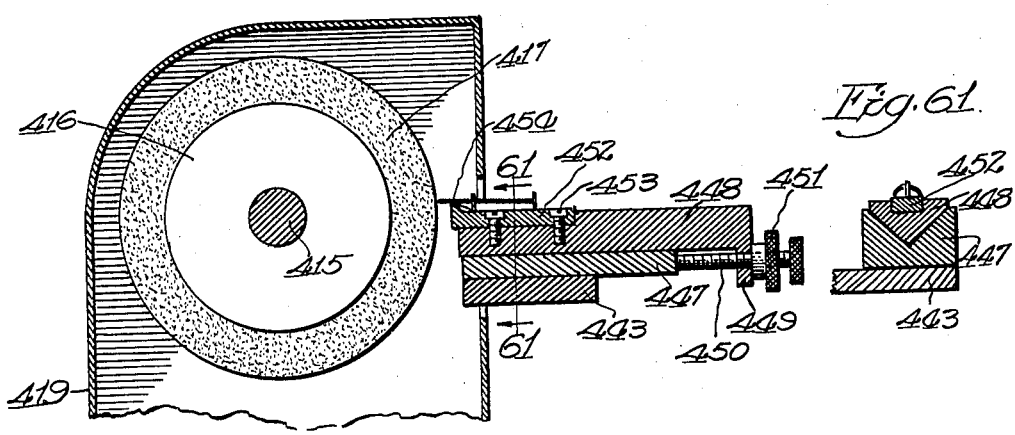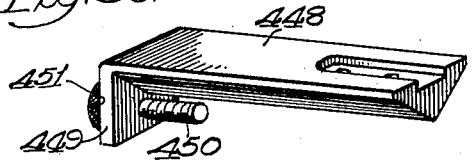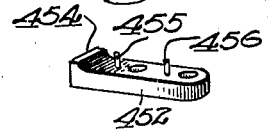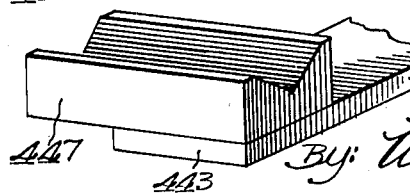

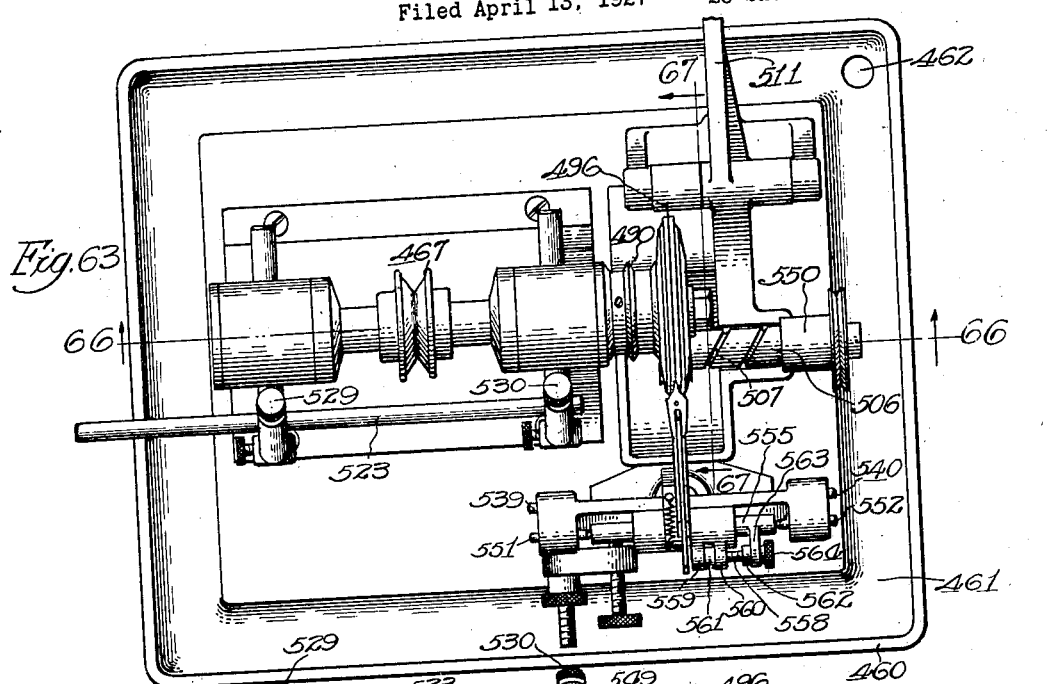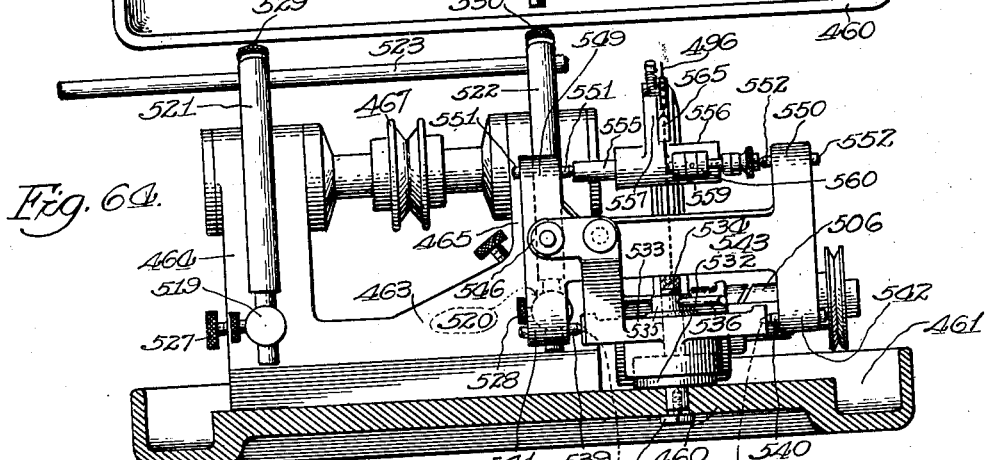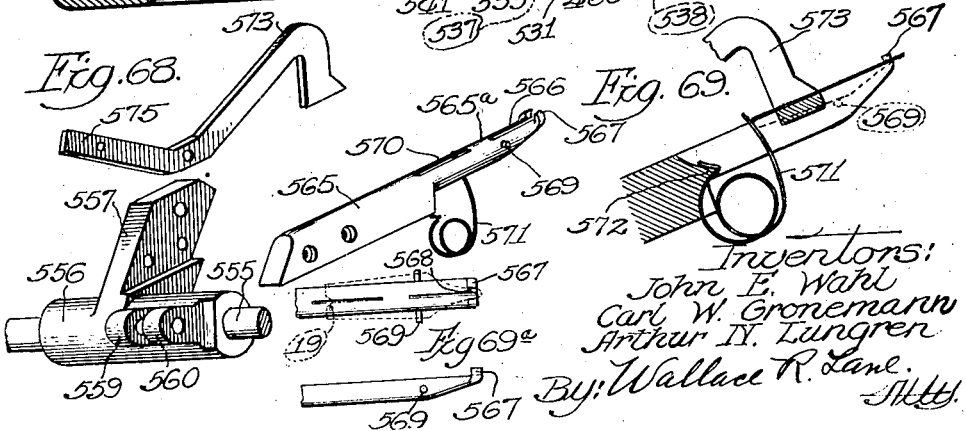

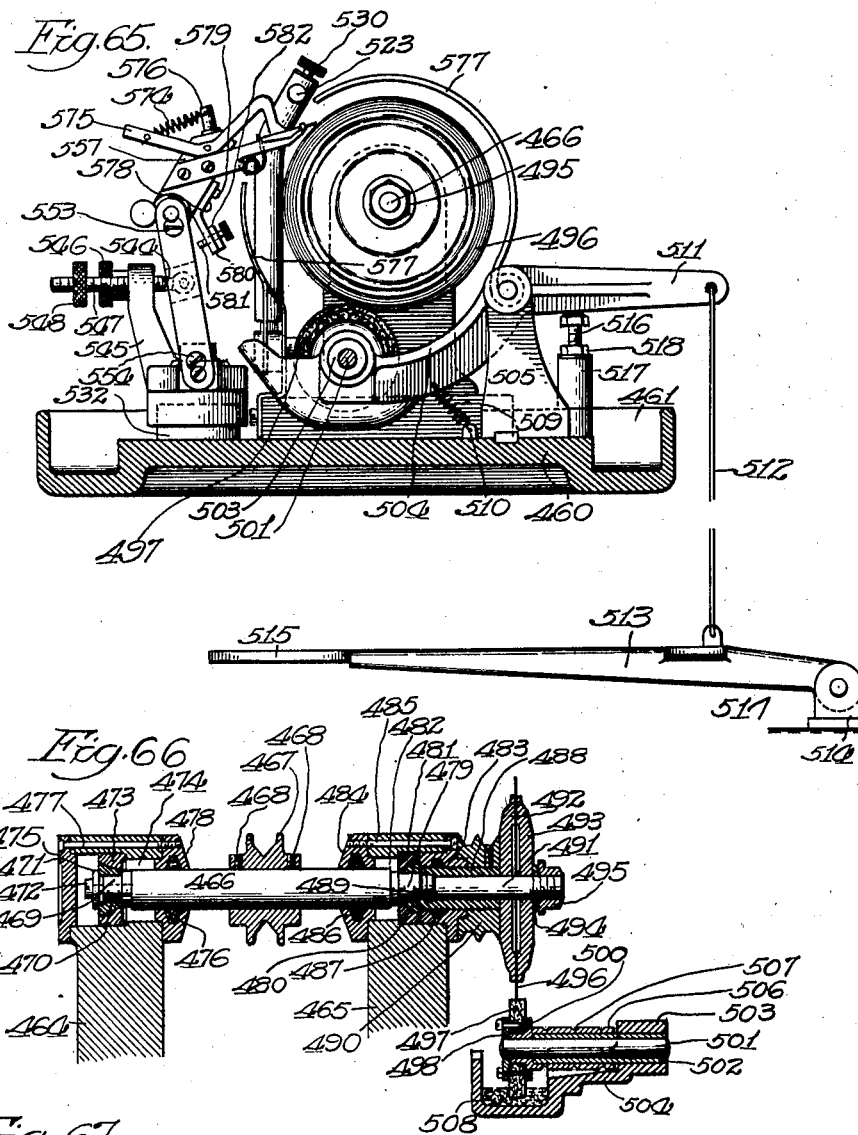

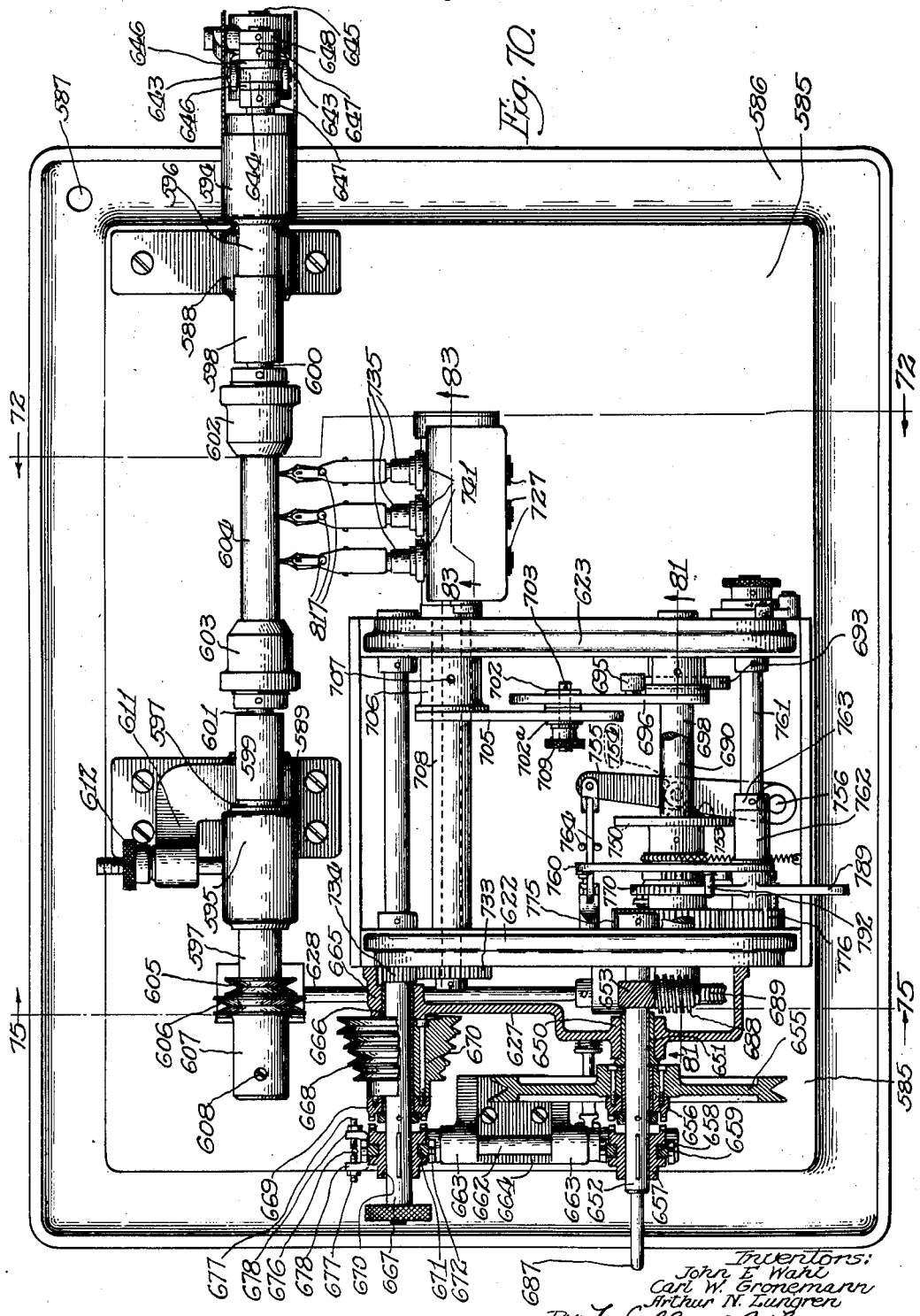

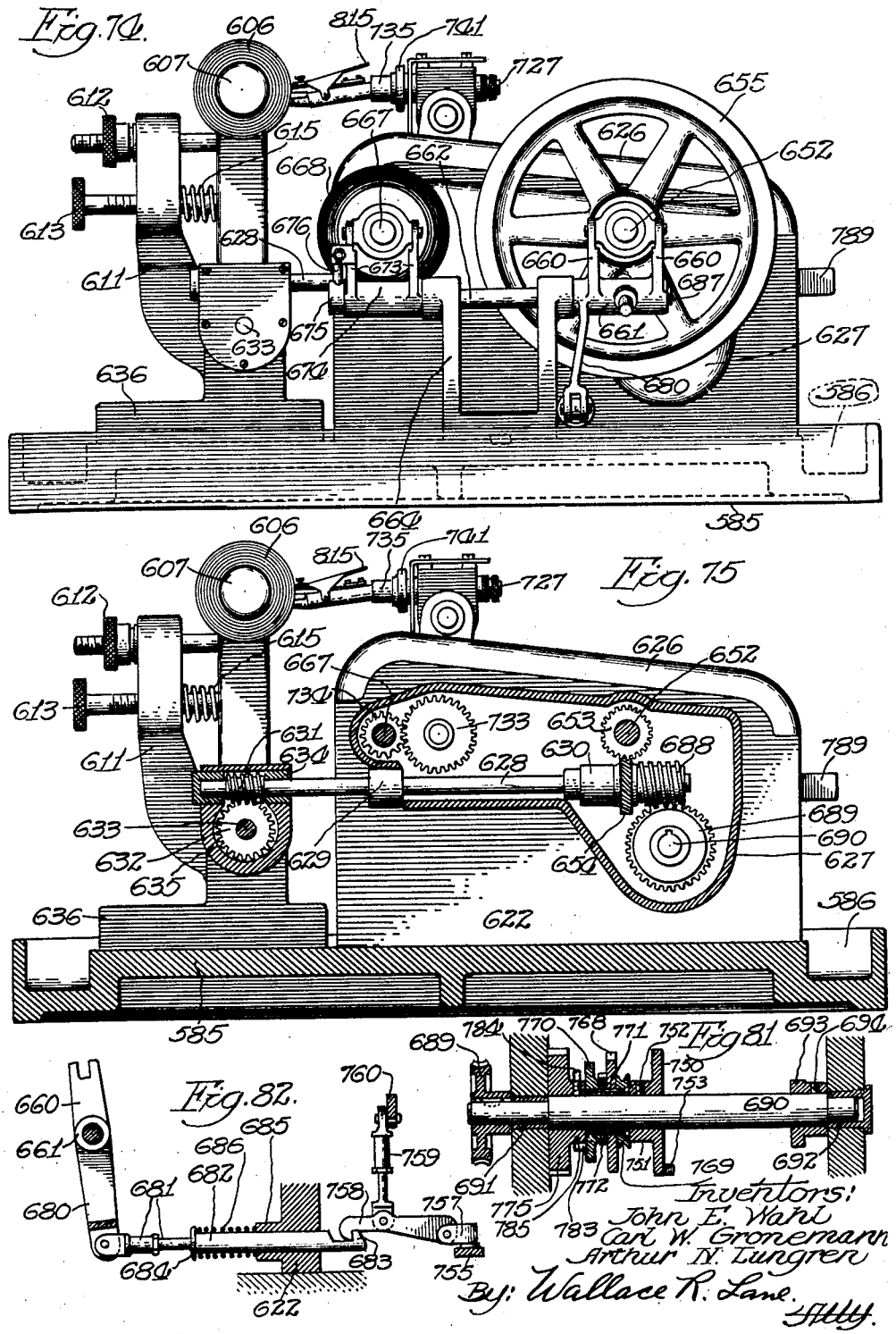

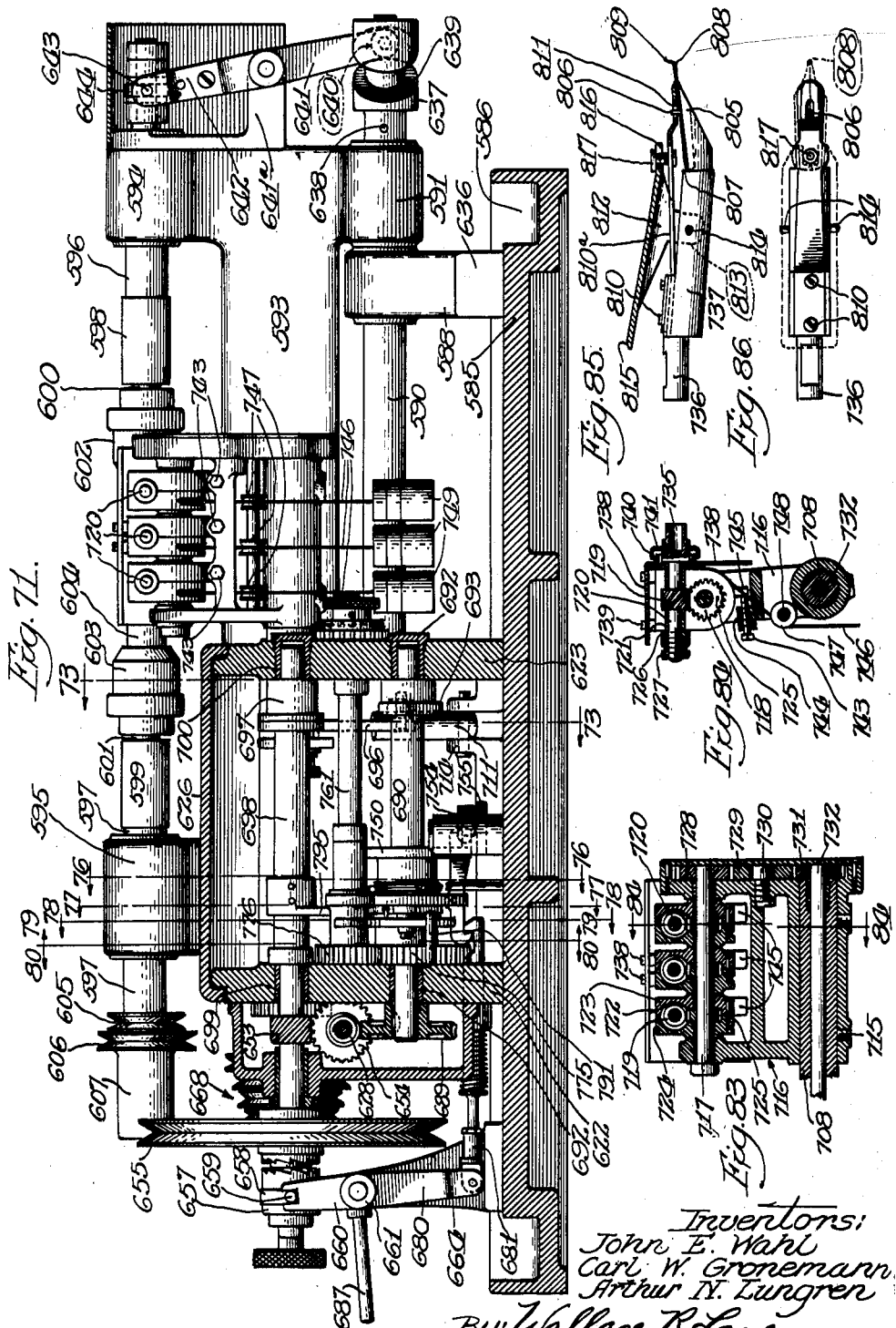

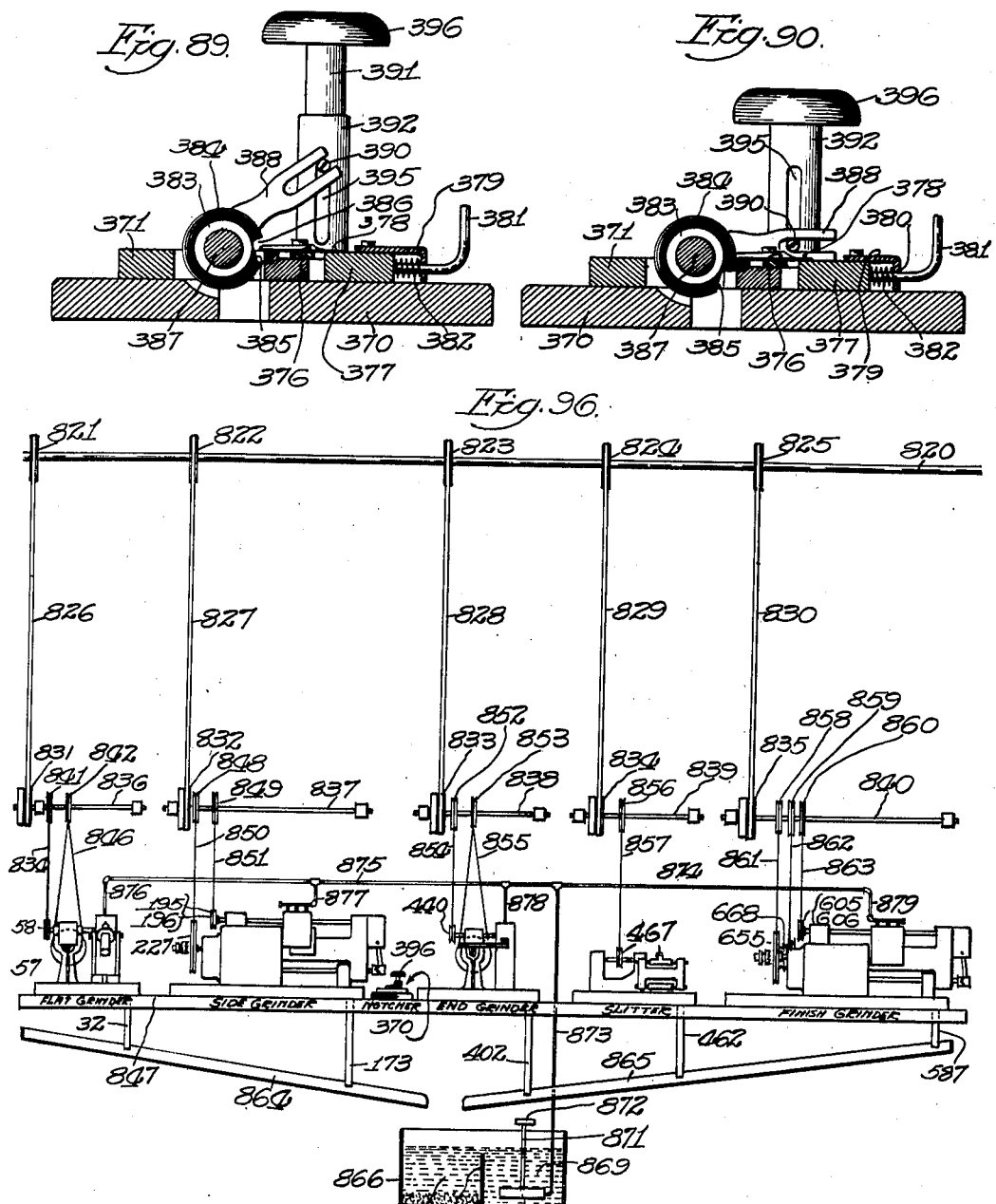

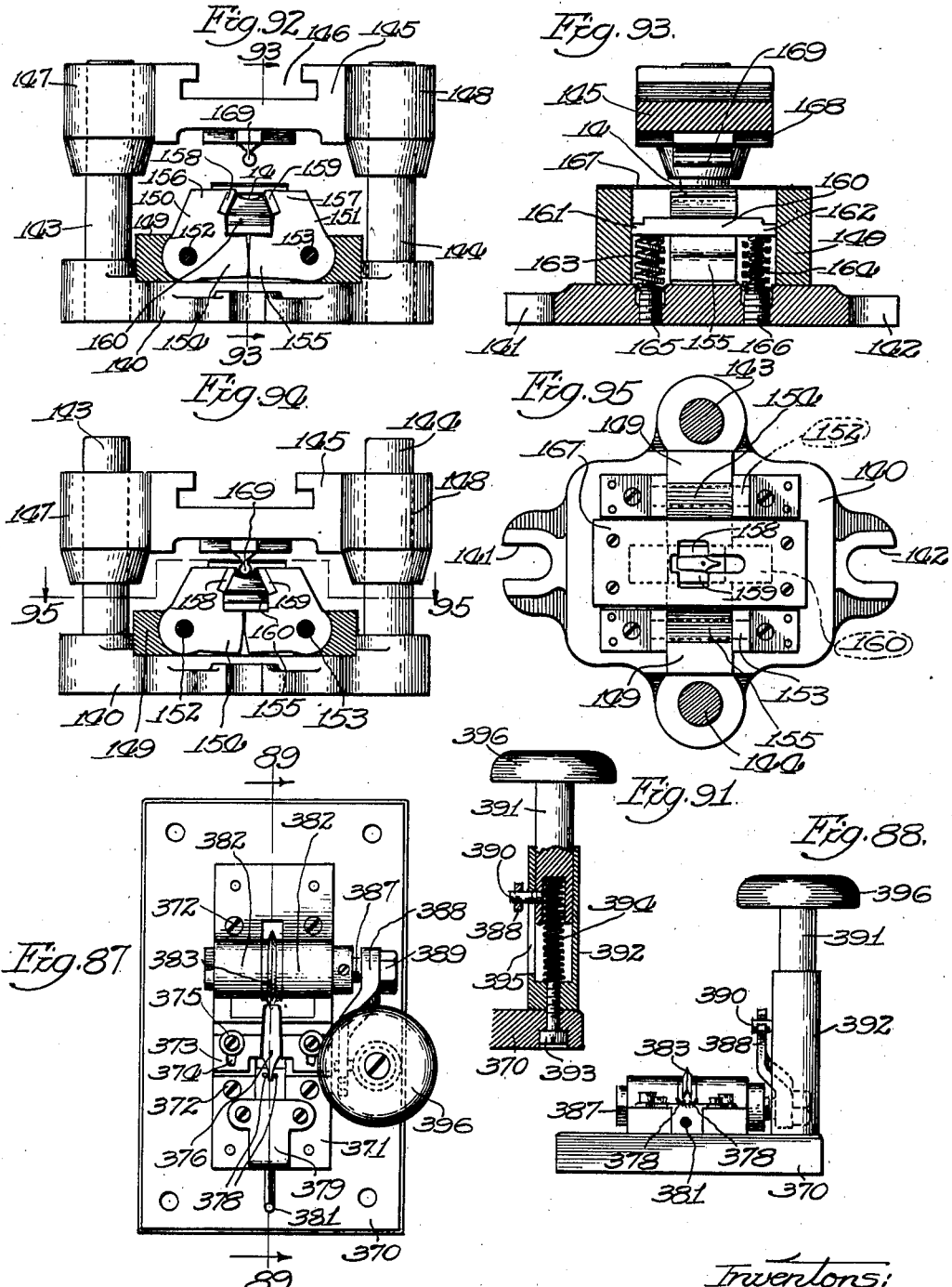

Patented July 19, 1932

1,867,932

UNITED STATES PATENT OFFICE

JOHN E. WAHL, CARL W. GRONEMANN, AND ARTHUR N. LUNGREN, OF CHICAGO ILLINOIS, ASSIGNORS TO THE WAHL COMPANY, OF CHICAGO, ILLINOIS, A CORPORATION OF DELAWARE

MEANS FOR MAKING PEN NIBS

Application filed April 13, 1927. Serial No. 183,431.

The present invention relates to the making of nibs, for pens, and the like.

Among the objects of the invention is to provide novel means for and method of effecting pen nibs with mechanical and automatic operations to the end of producing a greater number of more uniformly produced nibs than heretofore, and also reducing the cost and labor of making the same. Hand operations have been greatly reduced.

The invention also comprehends the forming and finishing of the nibs from blank stock, and in the specific steps of the process, includes the use of novel means for reducing the stock to desired thickness; producing blanks from the same; reducing a portion to form the point to desired thinness; fusing a hard metal or the like to the reduced point; shaping the latter, as by the grinding of opposite sides of the fused part; effecting the desired thickness and shape of the body portion of the nib blank; aperturing, notching and marking the shaped blank; shaping, as by grinding, the opposite side or edge portions of the point; shaping the tip of the point, such as by grinding it; slitting the point; and finishing the point, as by rounding and the like by grinding.

Another object of the invention is to provide novel means for effecting each and all of these steps and results.

Other objects, advantages, capabilities and the like are comprehended by the invention as will be made apparent from the disclosure and claims herein, as will later appear and as are inherently possessed by the invention.

Referring to the drawings:

Fig. 1 is a fragmentary perspective view of a strip of stock from which the nib is made.

Fig. 2 is a similar view of the same after reduction in thickness to that for forming blanks.

Fig. 3 is a perspective view of a blank punched from the piece shown in Fig. 2.

Fig. 4 is a similar view of the blank showing the end of the point portion flattened.

Fig. 5 is a similar view with a piece of hard metal, such as iridium or the like, in place upon the flattened point or tip ready for welding or fusing thereto.

Fig. 6 is a similar view with a bead of the metal at the top of point end and the thinned portion fused around the bead.

Fig. 7 is a side or edge view of the same.

Fig. 8 is a similar view of the same after the flat grinding of the bead of fused metal and envelope.

Fig. 9 is a plan view of the same after having been operated upon by a rolling mill for thinning and lengthening the body portion of the blank.

Fig. 10 is a side or edge view of the same.

Fig. 11 is a plan view of the same showing the trimming punch operation.

Fig. 12 is a plan view of the punch-trimmed blank ready for shaping to a curved form.

Fig. 13 is a plan view of the blank after perforating the body portion on a center line, and stamping symbols or marks thereon.

Figs. 14, 15 and 16 are plan, side and end views respectively of the blank after operation in a die press for shaping the body of the blank into a transversely curved form.

Fig. 17 is a plan view of the same showing the grinding operation at the sides or edges of the point.

Figs. 18 and 19 are plan and side views of the same after notching the rear end of the blank.

Fig. 20 is a plan view of the same showing the end squaring or square-grinding of the end of the tip or point of the nib.

Fig. 21 is a plan view of the same with or without the rounding of the corners and edges and the end of the tip.

Fig. 22 is a plan view of the same after slitting.

Fig. 23 is a side view of the same after rounding or grinding of the edges, corners and the end of the tip or point.

Fig. 24 is a perspective view of a finished and polished nib ready for writing therewith.

Fig. 25 is a top plan view of a flat grinding device.

Fig. 26 is a transverse sectional view of the same taken in a plane represented by line 26—26 in Fig. 25.

Fig. 27 is a sectional view taken in a plane represented by line 27—27 in Fig. 26.

Fig. 28 is a side elevational view of the same with the base in section.

Fig. 29 is a transverse sectional view of holder means and taken in a plane represented by line 29—29 in Fig. 26.

Fig. 30 is a transverse sectional view of the same taken in a plane represented by line 30—30 in Fig. 26.

Fig. 31 is a longitudinal sectional view of the grinding feature and taken in a vertical plane represented by line 31—31 in Fig. 25.

Fig. 32 is a top plan view with parts removed of a side grinder or mechanism for grinding the side edges of a nib.

Fig. 33 is a rear elevational view of the same.

Fig. 34 is a front elevational view of the same with parts shown in section.

Fig. 35 is an end view of the same.

Fig. 38 is a transverse sectional view of the same taken in a plane represented by line 38—38 in Fig. 34.

Fig. 39 is a transverse sectional view of the same taken in a plane represented by line 39—39 in Fig. 34.

Fig. 40 is a transverse sectional view of the same taken in a plane represented by line 40—40 in Fig. 34.

Fig. 41 is a transverse sectional view of the same taken in a plane represented by line 41—41 in Fig. 34.

Fig. 42 is a transverse sectional view of the same taken in a plane represented by line 42—42 in Fig. 34.

Fig. 43 is a transverse sectional view of the same taken in a plane represented by line 43—43 of Fig. 34.

Fig. 44 is a transverse sectional view of the same taken in a plane represented by line 44—44 in Fig. 34.

Fig. 45 is a fragmentary and longitudinal sectional view taken in a plane represented by line 45—45 in Fig. 32.

Fig. 46 is a fragmentary and detail elevational view of the clutch and release features shown at the left end of Fig. 34.

Fig. 47 is a fragmentary top plan view of a feed means in said device.

Fig. 48 is a longitudinal sectional view of the same in a vertical plane represented by line 48—48 in Fig. 47.

Fig. 49 is a transverse sectional view of the same taken in a plane represented by line 49—49 in Fig. 48.

Fig. 50 is a fragmentary and longitudinal sectional view taken in an oblique plane represented by line 50—50 in Fig. 36.

Fig. 51 is a side view partly in elevation and partly in section of a nib holder or mandrel with a nib in place.

Fig. 52 is a top plan view of the same.

Fig. 53 is an end view of the same.

Fig. 54 is a top plan view with parts broken away, of an end grinder or means for removing material from the end or tip of the nib and for squaring said tip.

Fig. 55 is a front elevational view of the same with the base shown in section.

Fig. 56 is a transverse sectional view of the same taken in a vertical plane represented by line 56—56 in Fig. 54.

Fig. 57 is a fragmentary longitudinal sectional view taken in a vertical plane represented by line 57—57 in Fig. 54.

Fig. 58 is a fragmentary transverse sectional view taken in a vertical plane represented by line 58—58 in Fig. 54.

Fig. 59 is a perspective view of a slide feature therein.

Fig. 60 is a perspective view of a guide feature therefor.

Fig. 61 is a transverse sectional view of the slide and guide feature taken in a plane represented by line 61—61 in Fig. 58.

Fig. 62 is a perspective view of a nib holding block associated with the slide and guide device.

Fig. 63 is a top plan view of a slitting device for the nibs.

Fig. 64 is a front elevational view of the same with the base shown in section.

Fig. 65 is an end view in elevation of the same and with the base shown in section.

Fig. 66 is a longitudinal sectional view taken in a vertical plane represented by line 66—66 in Fig. 63.

Fig. 67 is a fragmentary sectional view taken in a transverse vertical plane represented by line 67—67 in Fig. 63.

Fig. 68 is a perspective view in spaced assembly of a nib arbor means.

Fig. 69 is a fragmentary longitudinal median sectional view of the nib arbor shown in Fig. 68.

Fig. 69a is a fragmentary top plan and side elevational view of said arbor.

Fig. 70 is a top plan view of a finishing grinder or means for finishing the edges, top and bottom and end of the nib tip.

Fig. 71 is a rear elevational view of the same with parts shown in section.

Fig. 74 is an end view in elevation of the same.

Fig. 75 is a transverse sectional view of the same taken in a plane represented by line 75—75 in Fig. 70.

Fig. 76 is a transverse sectional view of the same taken in a vertical plane represented by line 76—76 in Fig. 71.

Fig. 77 is a fragmentary transverse sectional view of the same taken in a vertical plane represented by line 77—77 in Fig. 71.

Fig. 78 is a fragmentary transverse sectional view of the same taken in a vertical plane represented by line 78—78 in Fig. 71.

Fig. 79 is a fragmentary transverse sectional view of the same taken in a vertical plane represented by line 79—79 in Fig. 71.

Fig. 80 is a fragmentary sectional view of the same taken in a vertical plane represented by line 80—80 in Fig. 71.

Fig. 81 is a fragmentary longitudinal sectional view taken in a vertical plane represented by line 81—81 in Fig. 70.

Fig. 82 is a detail and part sectional view of release mechanism shown at the left hand end of Fig. 71.

Fig. 83 is a fragmentary longitudinal sectional view taken in a vertical plane represented by line 83—83 in Fig. 70.

Fig. 84 is a transverse sectional view of the same taken in a vertical plane represented by line 84—84 in Fig. 83.

Fig. 85 is a part side and part sectional view of a nib holding arbor used in the finishing device.

Fig. 86 is a top plan view of the same.

Fig. 87 is a top plan view of a nib notching device.

Fig. 88 is an end view of the same.

Fig. 89 is a longitudinal sectional view of the same taken in a vertical plane represented by line 89—89 in Fig. 87 and showing relation of parts in the operation of the device.

Fig. 90 is a similar sectional view showing another relation of the parts shown in Fig. 89.

Fig. 91 is a fragmentary vertical sectional and part elevational view of the same.

Fig. 92 is an elevational view partly in section of a sub-press or forming dies for shaping the nib into curved form.

Fig. 93 is a transverse sectional view of the same taken in a vertical plane represented by line 93—93 in Fig. 92.

Fig. 94 is a view similar to Fig. 92 but showing the press in shaping position.

Fig. 95 is a horizontal sectional view, showing parts in top plan, of the same taken in a plane represented by line 95—95 in Fig. 94.

Fig. 96 is an elevational and schematic view of a plant utilizing the means and processes for making the nib and allied mechanisms.

Figure 36:
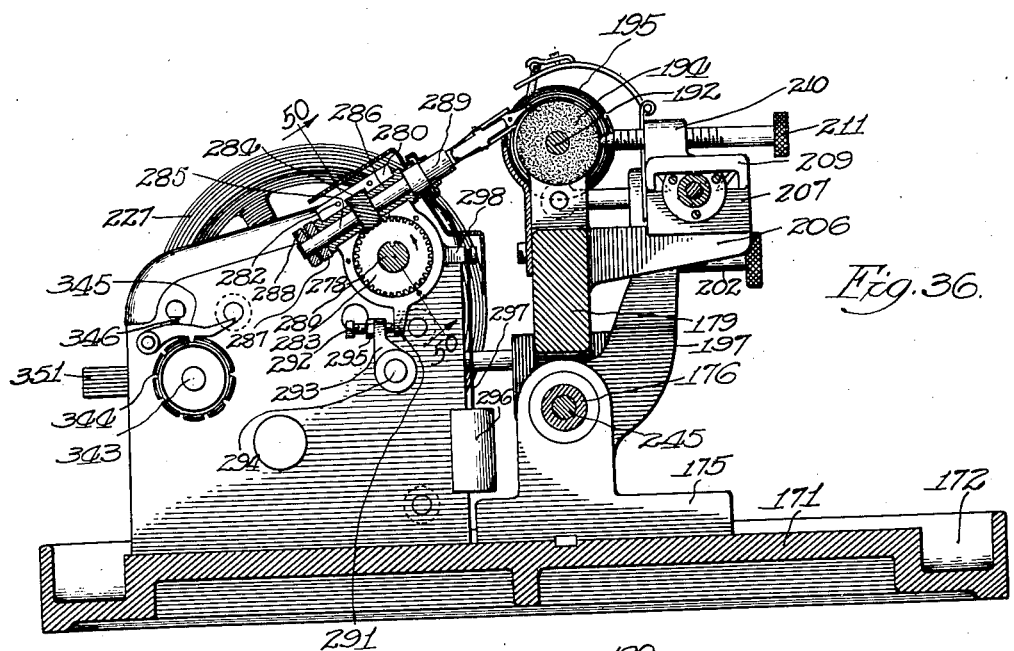
Fig. 36 is a transverse sectional view of the same taken in a plane represented by lines 36—36 in Fig. 34.
Figure 37:
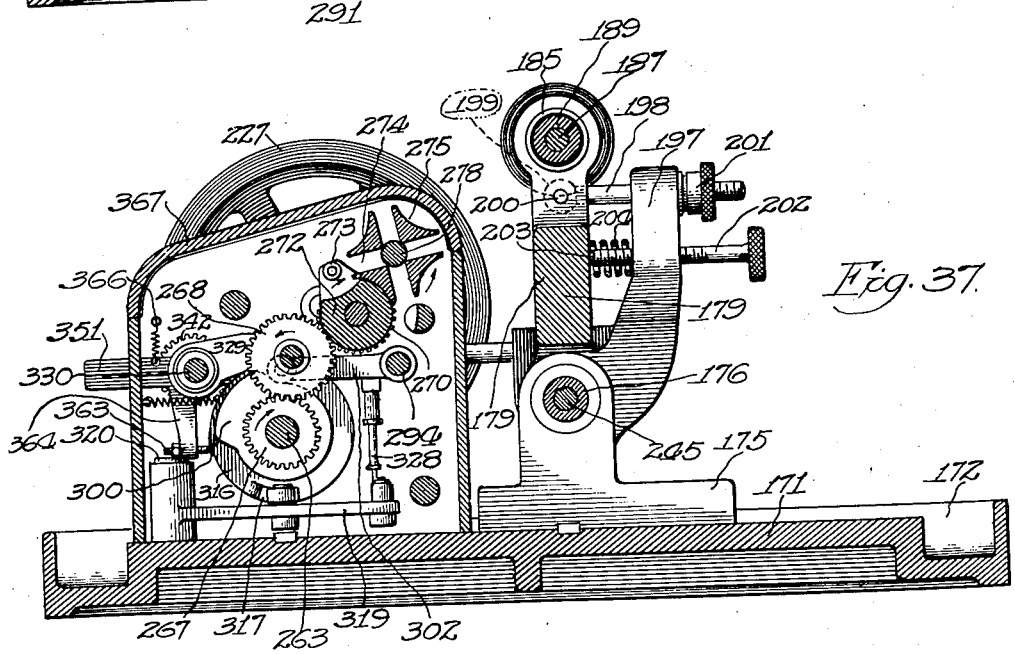
Fig. 37 is a transverse sectional view of the same taken in a plane represented by lines 37—37 in Fig. 34.

Referring now more in detail to the drawings illustrating an embodiment of the means chosen to illustrate the invention and also the mode of carrying out the novel process, and referring first more particularly to Figs. 1 to 24, inclusive, the production of a nib is effected from a piece of alloyed stock 1 which may be of a composition of gold or the like and other metals to obtain the proper alloy. This piece of stock is preferably passed through a rolling mill one or more times to reduce the same to the desired thickness to produce a blank stock piece 2, as clearly shown in Fig. 2 of the drawings. From this blank stock may be punched or stamped nib blanks 3 having a body portion 4 and a tip or point portion 5. The blank may then be placed into a suitable press for pressing and reducing the thickness of the point 5 to produce the relatively thin reduced portion or tip 6, as clearly shown in Fig. 4. Upon this reduced portion 6 may then be placed a small piece of hard material, such as iridium, tungsten or other similar and like metals or compositions thereof, this piece of metal 7 being provided with the required and suitable flux for the fusing of the same to the portion 6. This metal part or piece 7 and the tip portion 6 are then subjected to a fusing heat or flame to produce a fused or welded bead 8, as clearly shown in Figs. 6 and 7. When effecting this fusing the thin metal part 6 may first melt and envelop the hard metal piece 7 and then further heating will cause the latter to fuse and weld with the envelope 6 and form the bead 8.

In order to remove the envelope and to expose surfaces of the hard metal piece 7, the blank is then placed in a mechanism, such as that shown in Figs. 25 to 30 inclusive, for removing parts of the bead from opposite sides thereof, such as from the top and bottom sides of the bead as viewed in Fig. 7 of the drawings. This mechanism is referred to hereinafter as the flat grinding means and is more completely described hereinafter. When the metal piece 7 is being fused, it may not always be exactly in the central or medial plane of the blank and may extend to a greater or less extent to one side of such plane. This position will determine what will be the top and bottom portions of the pen nib when later shaping it into curved form. Thus when grinding or removing opposite sides of the bead, it will be so ground as to leave a flat surface 9 in a plane parallel to and spaced from the top surface of the blank and leaving a projecting portion 10 on that side of the blank, as clearly shown in Fig. 8. The opposite side may be ground flat to form a surface 11 substantially in the plane of the under surface of the blank, also clearly shown in Fig. 8.

The blank is then placed in the roller press for the purpose of thinning and widening the body portion 4 of the blank yet without effecting any rolling or pressing action upon the tip portion thereof. This operation may be effected by one or more passes, usually three passes, to produce the elongated and widened body portion 12 which tapers from the tip portion 13 to the rear end thereof. The shape and form of this blank is clearly shown in Figs. 9 and 10 of the drawings. This blank is then placed in a press for punching out or cutting to produce the nib blank body 14 as shown in Figs. 11 and 12. This blank is still in the flat form and ready to be perforated and marked. It will be noted that the trimmed portion 15 runs from the tip 13 without affecting it so that the blank 14 takes the shape shown in Fig. 12 of the drawings.

This blank is now ready to be apertured and marked, by the provision of a centrally disposed aperture 16 and a marking, as clearly shown in Fig. 13. It will be noted that this is effected on the opposite face from which projects the projecting part 10 of the flattened bead, and such that the projecting portion of the bead will be on the under side of the tip and the finished nib, as shown in Fig. 15.

The blank is then placed in a press such as that shown in Figs. 92, 93, 94 and 95 of the drawings, to shape the body of the blank into transversely curved form as clearly shown in Figs. 14, 15 and 16 of the drawings.

The shaped blank is then placed in a mechanism, such as that shown in Figs. 32 to 53 inclusive, shown upon the drawings, for the purpose of removing material from the sides or opposite edges of the tip, the amount of such material 17 being shown in Fig. 17 by dotted lines as distinguished from the full lines of the shape of the tip 18 after the removal of such material.

The blanks are now ready for removal of material upon the very tip of the point as by square grinding. In order that the nib blank may be positioned in properly centered location while effecting this operation, it is preferable to provide means, such as a notch 19 in the rear or tail end of the blank. This notching may be effected by the means shown in Figs. 87, 88, 89, 90 and 91 of the drawings. This notch is effected in a center line coinciding with the aperture 16 so that when the nib blank is placed in the end grinder, it will be in perfectly centered position so that the end may be properly squared.

The blank is then placed in a mechanism for removing material from the tip of the point as in the means shown in Figs. 54 to 62, inclusive, of the drawings. In this machine tip material 20 may be removed as shown by the dotted line portion in Fig. 20 of the drawings as distinguished from the full line end 21 and showing the shape of the tip after such removal.

If the point of the nib is made with material for soft points and the nib is of the cheaper grade, the point of the nib may now be rounded, or if the point of the nib is provided with a higher grade of hard metal 7, it is preferable that the point be slitted before rounding. For the purpose of slitting the blank is placed in a mechanism such as that shown in Figs. 63 to 69a inclusive, of the drawings. The aperture 16 and the notch 19 aid in properly centering the blank in position for the effecting of the slit 22 from the tip to the aperture 16, as clearly shown in Fig. 22.

The blank may then be placed in a mechanism such as that shown in Figs. 70 to 86 of the drawings, whereby the edges, corners, and the tip portion of the point may be rounded and made smooth, and to take the form shown in Figs. 21 and 23 of the drawings. The nib may then be polished or burnished and is then ready to be marketed and used, and is of the general form shown in Fig. 24 of the drawings.

Referring now more particularly to Figs. 25 to 31, inclusive, which show an abrasive means for removing material from the opposite sides or faces of bead 8 to produce the shape shown in Fig. 8 of the drawings, the abrasive mechanism mentioned, comprises a supporting base 30 which is preferably formed with a trough 31 having a drain outlet 32, this trough and drain being adapted to receive and to drain off any of the liquids and suspended foreign matters, such as particles of gold, and the like, to a common collecting receptacle, such as that shown in Fig. 96 of the drawings. Upon the supporting base 30 is rigidly carried a supporting pedestal 33 having a pair of upwardly extending arms 34 and 35 bored to carry bearing sleeves or bushings 36 and 37 in which is rotatably supported and also longitudinally slidable a shaft 38 carrying an abrasive member or grinding stone 39. The latter is carried upon a metal core 40 suitably secured to a reduced end portion 41 of the shaft and secured in place by a washer 42 and a fastening screw 43 threaded into the end of the shaft portion 41.

Upon that portion of the shaft 38 extending between the arms 34 and 35 is secured a pair of spaced collars 44 and 45, as by set screws or the like. Between these collars is loosely mounted a trunnion ring 46 having laterally extending trunnions 47 pivotally fitting in trunnion blocks provided in the upper ends of yoke arms 48 of yoke member 49 pivotally supported upon a transverse shaft 50 forming a rigid part of a block 51 secured upon an integral portion of the pedestal, as clearly shown in Figs. 26 and 31 of the drawings. From the yoke member 49 depends a tail piece 52 which is slotted and slidably carries a block 53 in which is rotatably received a crank pin 54 of a crank disc 55 forming a rigid part of a shaft 56 rotatably mounted in suitable bearing bushings in a bearing 57 forming an integral part of the pedestal 33. To the outer end of the shaft 56 is secured a grooved pulley 57ª adapted to be driven by a belt from an overhead shaft.

To the other end of the shaft 38 is secured a driving grooved pulley 58 which has a hollow hub 59 extending toward the end of the shaft 38 and secured thereto by a set screw or the like 60. At the end of the shaft carrying the abrasive member is also connected a hollow hub or sleeve member 61 having an end portion 62 thereof seated upon the shoulder between the shaft and reduced portion 41 thereof, and between said shoulder and the core member 40. It will be apparent from the drawings, and particularly Fig. 31 thereof, that the hollow members 59 and 61 overlap and telescopically engage with the extended portions of the bearing sleeves 36 and 37, for the purpose of preventing the entry of foreign material, such as grit, particles of gold, and the like, as well as any of the liquids used in the abrasive action, from entering or having access to the bearing surfaces between the shaft and the bushings 36 and 37.

Lubricating means 63 of any suitable nature may be provided for supplying lubricant through apertures 64 in the bushings 36 and 37, as clearly shown in Fig. 31.

A guard 65 may be fastened to the yoke arms 34 and 35 to surround and protect the mechanism therein and therebetween, as clearly shown in Figs. 26 and 31. A guard or shield may also be provided for the abrasive member 39 and may comprise a casing member 66 fastened to any fixed part of the base 30 and a shield 67 bearing clips 68 adapted to snap over the edge 69 of the casing member 66, as clearly shown in Fig. 31. The shield may be thus readily removed for access to the grinding member when desired. A fluid, such as water, or the like, may be supplied to the abrasive member through a duct 70 connected to a nipple 71 extending through a peripheral portion 72 of the shield 67.

In the operation of this part of the device, the pulley 58 continuously rotates the shaft 38 and the connected abrasive member 39. At the same time the pulley 57 rotates the shaft 56 and crank pin 54 so as to angularly reciprocate the tail piece 52 thus giving an angular reciprocation to the yoke and the trunnion ring 46, whereby the shaft 38 is given an axial reciprocation. In this way the surface of the abrasive member 39 will not be worn in a groove but may be axially reciprocated so that the wearing on the surface thereof may be distributed and even. With the shaft 38 will also reciprocate the hollow members 59 and 61, sufficient clearance being permitted between the heads thereof and the ends of the bushings 36 and 37 to allow such reciprocation, and yet without the telescopic relation of the same being destroyed. Any material thrown from the abrasive member will be caught in the shield 66—67 and be received in the trough 31 and drained through the passage 32. The guard 65 will also prevent the entry of stray or foreign material into the reciprocating mechanism between the shaft 31 and the shaft 56.

Upon the base 30 and forwardly of the abrasive means is supported a nib supporting means or device 72 having lateral projections 73 and 74 which are slotted to receive securing elements 75 and 76 fastened to the base 30. The slots will permit a certain amount of movement of the supporting means 72 forwardly and rearwardly to the extent of the length of the slots. To the bottom 77 of this supporting member is fastened a guiding key 78 as by means of screws 79 and 80, this guiding member being adapted to slide in a groove or slot 81 provided in the top surface of the base 30 and also adapted to receive the key with a sliding fit. At the sides of the supporting member rise arms 82 and 83 to provide a space therebetween for a universally mounted means for holding a nib in place for operation upon the abrasive member. The upper end portions 84 and 85 of the arms are bored to receive pivots 86 and 87 upon the tapered inwardly extending ends 88 and 89 of which is pivotally mounted a bearing block 90 as clearly shown in Figs. 27 and 29 of the drawings. These pivots 86 and 87 may be axially adjusted by means of adjusting screws 91 and 92 threaded into the portions 84 and 85 and having heads 93 and 94 of disc shape and fitting into notches 95 and 96 formed in the lower parts of the outer end portions of the pivots 86 and 97, as shown in Fig. 29. The heads 93 and 94 are adapted to move in counter bores 97 and 98 formed in the sides of the portions 84 and 85. The latter may also carry set screws 99 and 100 for securing the pivot members 86 and 87 in adjusted position. The bearing block 90 may be provided with oil passages 101 and 102 as shown in Fig. 29.

The bearing block 90 is longitudinally bored to receive the reduced portion 103 of a spindle 104, the block being provided with tapered bearing portions 105 and 106 within which are rotatably carried bearing pieces 107 and 108, the latter being fixed to the spindle as shown in Fig. 27, and the former being threaded to a forward end portion of the reduced part 103. The member 107 may be adjusted, from time to time, to take up for wear and to provide for proper rotative bearing. The spindle extends forwardly and is provided with a collet socket 109 having a tapered jaw in which cooperates a tapered portion 110 of a split collet 111. The blank 3 is capable of being placed in the jaws of this collet for operation upon the abrasive member 39. The socket extends rearwardly with a slide rod 112 slidably mounted axially in the spindle 104 and extending beyond the rear end thereof. To the rear end of the rod 112 is adjustably secured, as by threading, a nut 113 adapted to slide in a socket 114 provided in the rear end of the spindle. A coil spring 115 reacts between this nut 113 and the bottom of the socket 114 to normally urge the tapered portion 110 into engagement with the collet socket 109, to cause the socket jaws to close on the blank 3. The reduced portion 103 is also provided with a transverse slot 116 in which is adapted to slide a cross pin 117 extending through and fastened to the rod 112. This pin will prevent the rotation of the rod 112 as well as limit the forward movement of the rod 112 when releasing the collet from the socket 109 at the time when it is desired to remove or insert a blank 3.

Upon the top of the block 90 is secured a plate 118 by means of suitable securing elements such as screws 119. This plate has rearwardly extending arms 120 and 121 in which are threaded adjusting screws 122 and 123 which may be adjusted as desired and set in adjusted position by the set nuts 124 and 125. The downwardly extending ends 126 and 127 of these adjusting screws act as abutment stops for a stop pin 128 secured to a side of the spindle 104, as clearly shown in Fig. 30 of the drawings. From this it will be apparent that the spindle may be rotated in the block 90 through an angle of 180°, as from the full line position of the pin shown in Fig. 30 to the dotted line position thereof and in the direction of the arrow 129. When the pin is in the dotted line position, it may be swung in reverse direction to abut against the end 127 of the screw 123. The purpose of this is that when one of the sides of the blank 3 is presented to the grinding wheel, and after the spindle has been tipped, as will be later explained, the spindle may be turned 180° so that the opposite side of the blank may be presented to the grinding wheel in proper relation. In other words, the grinding of the bead on opposite sides is effected in parallel planes.

In the lower part of the supporting member 77 is secured a limit stop element 130 against which the lower or rear end portion of the spindle 104 may abut and be brought to a stop when the same is tipped about the axis of the pivots 86 and 87. In the vicinity of the stop 130 is also rotatably supported a release abutment roller 131 upon a cross pin or shaft 132 extending through spaced bosses 133 and 134 at the rear of the supporting member 77. This roller 131 is positioned so that when the spindle 104 is tipped to engage the limit stop 130, the outer end 135 of the rod 112 will engage with the curved surface of the roller and cause the rod 112 to slide axially and forwardly so as to disengage, automatically, the tapered portion 110 of the collet from the tapered jaw of the socket 109, so as to automatically release the collet jaws 111 from the blank 3, thus facilitating the ready withdrawal of the blank, and also the ready insertion of another blank. When the spindle 104 is withdrawn from the limit stop and the abutment roller, the spring 115 will automatically return the rod 112 and incidentally close the collet jaws 111 upon the blank 3.

In the operation of the device and assuming that the abrasive member is being operated, the spindle 104 is rotated about the pivots 86 and 87 to contact with the limit stop 130 and the end 135 of the rod 112 against the abutment roller 131 with the result, as above stated, of releasing the collet jaws. A blank is then inserted in these jaws and the spindle 104 withdrawn from the stops. By swinging the spindle, the bottom surface of the bead 8 will be brought into contact with the peripheral surface of the grinding element or member 39, to thus flatten that side of the bead and remove the enveloping metal about the iridium or other similar fused part or element. If this part of the bead should project laterally to a greater extent than on the opposite side of the blank, this side of the bead will be ground only for a slight extent so that this projected part will later form the under portion of the nib point, or, in other words, the writing part of the pen point. After a sufficient amount has been thus removed, the operator will then shift the spindle 104 through a partial angle, but not sufficiently to engage the stop 130 and roller 131, and will at the same time rotate the spindle 104 and the parts carried thereby through an angle of 180° to bring the pin 128 from engagement with one of the screws, as 123 to engagement with the other of the screws, as 122, or vice versa if the operation was started at 180° from this. This will present the opposite side of the blank and the bead for engagement with the periphery of the grinding member 39. This side of the bead may be ground to the desired extent. If it be the side opposite from that projecting most from the side of the blank, the bead may be ground substantially to the plane of the surface of the blank or nearly so. When this is completed the spindle may then be forced downwardly against the limit stop 130 and the roller 131 so as to automatically release the collet as above explained, whereby the blank may be readily extracted and a new blank inserted in place. The blank is then put through the process steps above described in connection with Figs. 9 to 13 inclusive and preparatory to the shaping of the blank in a shaping press to which descriptive reference will now be made.

Reference is now made to the mechanism shown in Figs. 92, 93, 94 and 95, which show a sub-press with forming dies, and capable of being used in a press of any suitable form. This sub-press comprises a lower die support 140 provided with bolt slots 141 and 142 for securement to the bed of the press. From the same rise rigid guiding posts 143 and 144 upon which is vertically slidable a movable forming die member 145 having a dove-tailed slot 146 for connection to the upper moving part of the press, and also having bored bosses 147 and 148 for slidably receiving the guides 143 and 144. Upon the base member 140 is supported in fixed position a die member 149 to which are pivotally connected V-shaped side dies 150 and 151 on cross shafts 152 and 153. The elements 150 and 151 have laterally extending arms or cam portions 154 and 155 with mutually engaging curved or rocking surfaces. The other legs or upwardly extending arm portions 156 and 157 carry oblique hard metal jaws 158 and 159 beneath and between which is located a forming die element 160 having tapered side surfaces co-operating and engaging with the inclined under surfaces of the jaws 158 and 159, so that when the element 160 is raised it will act as a wedge to separate the jaws 158 and 159, but when the element 160 is lowered, the jaws 158 and 159 may move laterally toward each other. The element 160 has extending end portions 161 and 162 normally resting upon springs 163 and 164 supported upon adjusting screws 165 and 166 threaded in the base member 140. A nest 167 may be provided above these die elements for aiding in properly positioning the blank 14, the cage 167 having a properly shaped aperture to facilitate such placing. To the upper member 145 is adjustably secured, as in a dove-tail groove 168, a rounded forming die element 169, this element being usually referred to as a punch.

In the operation of this device the blank 14 is positioned upon the die piece 160 as clearly shown in Fig. 95 of the drawings. The press then operates to lower the punch die 169 to cause the same to engage with the blank and press the same downwardly into the curved recess in the upper part of the die element 160. Further pressure will cause the die element 160 to descend against the spring compression and engage the arms 154 and 155, and causing the same to rock downwardly and hence incidentally cause the lateral movement of the jaws 158 and 159 toward each other and to engage the side edges of the blank so as to aid in bending the same to transverse curved form. When sufficiently shaped, the upper member 145 is raised, whereby the springs 163 and 164 will raise the die element 160 to engage with the tapered under surfaces of the jaws 158 and 159 to cause the same to separate and release the blanks. This blank is then placed in the mechanism for removing material from the side edges of the point to which reference will now be made.

Referring now to Figs. 32 to 53 inclusive, showing the mechanism for removing side portions of the forward or tapered nib point, such means is shown as comprising a base 171 formed with a trough 172 leading to a drain outlet 173 connected by suitable ducts to a common collecting receptacle shown in Fig. 96 of the drawings and which will later be described. Rising from this base member 171 are spaced supporting posts 174 and 175 carrying a bearing sleeve or bushing 176 which extends to and through suitable borings in the posts. This sleeve or bushing is in the form of a hollow shaft and extends beyond the posts and has secured thereto hubs 177 and 178 of an I-shaped beam 179 whereby the same may be moved angularly about the axis of the hollow sleeve or shaft 176. Above the hubs 177 and 178 and integral with the beam 179 are also alined similar hubs 180 and 181 suitably provided with bearings for rotatably supporting shafts 182 and 183. The inner portions of these shafts are in telescopic engagement with sleeves 184 and 185 which are preferably splined to the shafts 182 and 183 for axial relative sliding thereof. These sleeves 184 and 185 carry tapered centers or pins 186 and 187 to which are connected in tapered driving engagement, coupling members 188 and 189. The inner ends of these are secured, as by set screws 190 and 191 or the like, to the opposite ends of a spindle or pintle 192 carrying a rigid mandrel or similar member 193 to which is secured an abrasive member or grinding wheel 194. To one end of the shaft 183 is secured or fastened one or more grooved pulleys 195 and 196 adapted to be driven by a suitable belt and utilized for driving the grinding member at selected speed of rotation.

From the post 175 rises a laterally offset extension 197 through which extends an adjusting link 198 provided at one end with an eye 199 connected to a pin 200 rigid with a part of the beam 179. The link 198 passes through an aperture in the extension 197 and has a threaded end for the adjustment thereon of a thumb nut 201 reacting against the extension 197. Threaded in the extension 197 is also an adjusting screw 202 having its end 203 in abutting engagement with the back of the beam 179. A helical spring 204 also encircles the screw 202 between the extension 197 and beam 179, this spring reacting between these members. From the above it will be noted that the angular position of the beam 179 about the axis of the shaft 176 may be varied and adjusted by turning the thumb nut 201 and the screw 202, the spring 204 aiding in such adjustment.

To the rear of the beam 179 and preferably integral therewith are bracket members 205 and 206 upon which is rigidly supported a table 207 having a dove-tail track 208 for slidably supporting a carriage 209 carrying a tool post 210 in which is threaded a tool holder 211 carrying a dressing tool 212. The carriage 209 has secured to it a lead nut 213 as by means of set screws 214 or the like. The nut extends into a channel 215 in the table 207 and cooperates with a lead screw 216 having a collar 217 reacting against a thrust nut 218 secured in one end of the table 207. The lead screw has a shaft 219 finding suitable bearing in an extension 220 of the nut 218 and has secured to its end an operating manual handle 221 whereby the lead screw may be rotated to cause the tool post 210 to travel along the table when dressing the surface of the grinding member 194. A set screw 222 may be used to set the tool holder 211 in adjusted position when dressing the abrasive member 194.

Near one end of the support 171 rises a member 223 rigidly carrying a gear casing 224 having a bearing 225 for rotatably supporting a shaft 226 upon which is loosely rotated a grooved pulley 227. The shaft extends beyond the pulley and has secured to it a clutch member 228 which is grooved to receive a trunnion ring 229 carrying trunnions 230 cooperating with slotted ends of a yoke lever 231 rotatably secured to a fulcrum shaft 232 rotatably mounted in bearings 233 and 234 forming a part of supporting bracket or post 235 secured to the base member 171. The lever 231 may have secured thereto an arm or handle 236 whereby the lever may be manually shifted to operate the clutch at any time desired. The pulley 227 is loosely mounted upon the shaft 226 and has rigid therewith a clutch member 237 with which cooperates the clutch member 228 when it is shifted by the yoke lever 231.

Within the gear casing 224 the shaft 226 carries a spiral gear 238 meshing with a similar gear 239 secured to a transverse shaft 240 which at its forward end carries a worm 241 and extends at its rear end into a gear box 242 and also has a worm 243 meshing with a worm gear 244 fastened to one end of a shaft 245. The shaft 240 is supported in bearings 246 in the gear box 242 and also in a bearing 247 forming a rigid part of the supporting wall 223. The end of the shaft 226 is also rotatably supported in a bearing 248 forming also a rigid part, on the inside thereof, of the wall 223.

The shaft 245 extends through and is rotatably mounted in the hollow shaft 176 which supports the beam 179, and extends beyond the boss 177. To this end of the shaft 245 is secured a cam 249 having an oblique cam groove or channel 250 in which rides a cam roller 251 rotatably connected to the lower end of a lever 252 having a fulcrum 253 on a supporting bracket 254 fixed to one end of the beam 179. See Figs. 32, 33 and 34 of the drawings. The upper end of the lever 252 has yoke arms 255 pivotally receiving trunnions 256 of a trunnion ring 257 mounted upon a rear extension 258 of the shaft 182, and between collars 259 and 260 secured to such shaft extension.

From the above it will be apparent that the shaft 226 drives the shaft 240 through the gears 238 and 239 and in turn the shaft 240 drives the shaft 245 through the worm 243 and gear 244. The cam 249 on the other end of the shaft 245 oscillates the yoke lever 252 which will reciprocate the shaft 182 axially, thus giving the grinding member 194 an axial movement while it is at the same time being rotated by way of the pulleys 195 or 196. A housing 261 may be mounted upon the bracket 254 and enclose the mechanism operated by the lever 252.

The worm 241 operates a worm gear 262 secured to an end of a shaft 263 rotatably supported in a bearing bushing 264 secured in the wall 223, and extends to and is rotatably mounted in a bearing bushing 265 mounted in a supporting wall 266 in spaced relation with the wall 223. The shaft 263 forms part of the drive for the means for holding and operating the nibs in relation to the abrasive member 194. Upon the shaft 263 is secured a spur gear 267 in mesh with an idler gear 268 rotatably mounted upon a stud 269 fixed to the wall 266. The gear 268 in turn meshes with a gear 270 rotatably mounted upon a stud 271 also fixed to the wall 266. The gear 270 may be adjusted along the stud 271 for varying the relation of the parts driven thereby. To the gear 270 is secured a Geneva crank 272 carrying a roller 273 adapted to cooperate with grooves 274 of a Geneva wheel 275 having a hub 276 secured, as by a cross pin 277, to a shaft 278 supported in a bearing bushing 279 secured in the wall 266. From the above it will be apparent that when the Geneva wheel is operated through an angle of about 90°, the shaft 278 is given a corresponding turn or angular movement.

Upon the shaft 278 is supported a nib carrier device comprising a number of split blocks each comprising disks 280 and 281 secured together by any suitable securing means, such as pins passing through apertures 282, as shown in Fig. 36. Within these blocks and secured to the shaft 278 are spiral gears 283 meshing with spiral pinions 284 secured to shafts 285 rotatably mounted in bearing bushings 286 supported in the blocks 281. The shaft 285 may be axially adjusted and held in adjusted position by lock nuts 287 and 288 threaded to the rear end of the shaft 285. At the forward end of the shaft 285 is provided a chuck 289 in which may be releasably connected a shank 290 of a nib holder, such as shown in Figs. 51, 52 and 53, and which will be later described. From the above it will be noted that when the shaft 278 is given a quarter turn, the relation of the gears 283 and 284 is such that the shaft 285 and nib holder will be given a turn of 180°, so as to present the opposite edge of a nib to the abrasive member 194.

The carrier may have a shield or guard 299a secured in any suitable manner to the carrier blocks, the shield preferably having a flange portion surrounding the exterior portion of the shaft 285 or the socket 89. The latter may carry a shield or guard 289 with a flange overhanging the flange on the part 289a. This will guard against the entry of foreign matter, such as grit, particles of gold, liquids and the like in the bearings for the shaft 285 and other parts in the carrier.

Each block has a depending member 291 which is preferably formed integral with the disk 280 and cooperates with a stop screw 292 held in adjusted position in a crank 293 secured to a shaft 294, the operation of which will also be later explained. The screw 292 may be held in adjusted position by a lock nut 295.

The function of the crank 293 is to intermittently angularly move the blocks so as to raise the nib holder and nib just prior to the time of giving the nib holder a half turn, so that the nib point will not be then in contact with the abrasive member 194. In order to return the nib holder and nib so that it may be contacted with its other edge with the grinding member, and when the crank 293 is moved back, counterbalancing means is provided comprising weights 296 connected to cords 297 fastened to the end of arms 298 preferably made integral with disks 280. See Fig. 36 of the drawings.

Referring now to the mechanism for operating the crank 294, the shaft 263 has also secured thereto as by a cross pin 299 a cam 300 having a lobe cooperating with a roller 301 rotatably connected to an arm 302 secured to the shaft 294 supported in bearings in the walls 223 and 266. This shaft projects beyond the wall 266 and has secured to it the crank 293 as previously described. From this description it will be apparent that when the cam 300 is rotated by the shaft 263, it will operate through the arm 302 and shaft 294 to oscillate the crank 293, which was described above as rocking the blocks with the nib holders and the nibs to raise the same from the grinding member 194. After these have been raised, the Geneva wheel then operates to turn the gears 283 and 284, and hence to rotate the means for holding the nib holder through an angle of 180°. After the Geneva wheel has performed this operation, the cam 300 shall then proceed to the point where the arm 302 will descend upon the dwell portion of the cam, whereby the crank 293 is permitted to return. This return is effected by the counter-weights 296 acting through the arms 298 and disks 280 of the blocks. Thus the opposite edge of the nib will now be presented to the surface of the grinding member 194 for removal of material from that edge of the nib.

The nib holder, such as that shown in Figs. 51, 52 and 53, comprises a shank 290 which, as above explained, is capable of being inserted in the chuck 289, and also comprises a body member 303 at the forward portion of which is a seat 304 for the supporting thereon of a nib blank such as that shown in Figs. 14, 15 and 16 of the drawings. The seat member is in the form of a channel having side flanges 305 and 306 and a shoulder 307 against which the rear end of the nib may contact or engage. The seat member 304 may also have a pin 308 positioned to project through the aperture 16 of the blank. In this way the blank may be properly positioned within the seating channel for presenting the side edges of the point to the grinding element. The flanges 305 and 306 act to support the nib laterally for this purpose. In order to hold the nib firmly in place, and yet be operative for a ready insertion and release of a nib blank, a spring pressed lever 309 is used, this lever having a finger portion 310 adapted to bear upon the back of the blank and an arm 311 normally acted against by a spring 312 located in a recess 313 in the body portion 303 of the holder. The lever 309 has ear portions pivotally mounted upon a cross pin 314 projecting through the body portion 303 of the holder.

The mechanism is designed so that it may be set for a given cycle of operations, so that each edge of the nib point may be operated upon by the grinding member either once, twice or any other number of times. After this has been effected the machine will then stop automatically. This is effected by the means now to be described. Upon the shaft 263 is secured, as by a set screw 315 (see Fig. 45) a cam member 316 having a lateral lobe 317 adapted to engage with a cam roller 318 pivotally connected to an arm or lever 319 fulcrumed upon a stud 320 fastened to the base 171. The other end of the arm is pivotally connected to a strap 321 which in turn is pivotally connected to a hook 322. These connections form a universal connection between the lever 319 and hook 322. The hook 322 is adapted to engage, when in lowered position, as shown in Fig. 46, with a hook 323 of a sliding bar 324 slidably supported in the wall 223 as clearly shown in Fig. 46. This bar is connected pivotally to the lower end of the yoke lever 231 so that when the cam 316— 317 operates through the lever 319 to cause the same to move to the right as viewed in Figs. 32, 34 and 46, the clutch 228 is automatically disengaged from the clutch 237, and hence the operation of the mechanism is stopped. The throwing of the clutch in the same way may be effected by operating the handle 236 at any time during the operation of the mechanism, and when again released, the mechanism will again continue to operate from the point where it was stopped. The shifting of the clutch 228 into engagement with the clutch 237 may be effected automatically by a helical spring 325 reacting between a shoulder 326 on the bar 324 and a boss 327 forming an integral part of the wall 223.

During the operation of the mechanism the hook 322 is held in raised position for a given time, depending upon the setting adjustment made, by means of a link 328 pivotally connected to the hook 322 and also at its upper end pivotally connected to an arm 329 fulcrumed upon a shaft 330 supported in the walls 223 and 266. Spaced guide pins 322ª may be secured (see Fig. 32) to the base 171 and located on opposite sides of the member 322 so as to guide it in its movements both longitudinally and upwardly and downwardly. The link 328 is of the telescopic adjustable type so that the length of it may be varied as desired. The arm 329 has a projection 331 which, during the operation of the machine, rides upon the periphery of a disk 332 until the same has been moved to a position where the projection 331 may fall into a notch 333 provided in said disk. This disk is loosely mounted upon the shaft 263 and has connected to it a grooved sheave 334 and a ratchet 335, the latter having a hub upon which is loosely rotatable a pawl ring 336. These members, namely disk 332, sheave 334 and ratchet 335 are secured together by connecting screws 337 so that these units are united into a unitary structure capable of rotating in unison, and loosely upon the shaft 263. The ring 336 rotates loosely upon the hub of the ratchet 335. A spring 338 is connected to the sheave and extends through a substantial portion of the groove thereof and is extended rearwardly for connection at its other end to a pin 339 fixed to a front wall 340 of a casing attached to the walls 223 and 266. The spring 338 normally tends to rotate the unit in a counterclockwise direction as viewed in Figs. 39 to 43 inclusive. Adjacent to the ratchet 335 and loosely mounted upon the shaft 263 is a gear 341 which meshes with a gear 342 secured to the shaft 330 above described. This shaft 330 extends beyond the wall 266 and has secured thereto a thumb nut 343 with graduations and notches 344 cooperating with a catch 345 pivotally mounted upon the wall 266 (see Fig. 36) and acted upon by a spring 346 for cooperation of a projection of the catch with the notches.

The gear 341 has a hub 347 carrying a pin 348 adapted to act as a stop pin or abutment for a projection 349 carried by the ratchet 335 and extending laterally therefrom. From this it will be seen that when the thumb nut 343 is turned, the gear 342 will also turn the gear 344 together with the pin 348 from the full line position shown in Fig. 43 to any given dotted line position thereof as shown in said Fig. 43. If the thumb nut 342 be turned to the first notch, this pin will move to the first position, and if turned to a further notch, it will be turned to a position such as that shown in dotted lines and designated as 348a in Fig. 43 of the drawings. Assuming it to have been turned to this extent, the spring 338, assuming the arm 329 has been raised, to clear the projection 331 from the notch 333, will then act to rotate the unit with the disk 332 and the ratchet 335 so that the projection 349 of the ratchet will come into abutting contact with the pin 348a. This is the setting for the timing of the operation of the machine. Assuming that this setting is at notch number four, it means that the machine will operate to the extent of each edge of the nib point being presented to the grinding member 194, four times, and then the machine will automatically stop. This will be more fully explained later.

In order that the spring may thus turn the unit, starting means is provided in the form of a lever 351 which may project outwardly through the front wall 340 of the casing for manual access. This lever is loosely mounted upon the shaft 330 and has a pawl 352 engaging with the teeth of the ratchet 335, thus holding the same from turning. Above the pawl 352 is located a pin 353 secured to and laterally extending from the arm 329. When the lever 351 is depressed outside of the casing the pawl 352 will be disengaged from the teeth of the ratchet and engaged with the pin 353 and thus raise the arm 329, thus releasing the projection 331 from the notch 333 in the disk 332. The spring 338 will then immediately rotate the unit until the projection 349 fixed to the ratchet, will come in contact with the pin 348 in the dotted line position 348a shown in Fig. 43 of the drawings. This starts the operation of the machine by reason of the raising of the arm 329 and the hook 322 connected thereto, thus releasing the latter from the hook 323, and permitting the spring 325 of the slide bar 324 to operate upon the yoke lever 231 and to throw the clutch 228 into engagement with the clutch 237 upon the driving pulley 227. It will be thus noted that the notch 333 shall then have moved a given angular distance toward the left, as viewed in Fig. 40 of the drawings, of the projection 331, such as in the dotted line position 333a thereof. The projection 331 will then be riding upon the periphery of the disk 332 and hence the hook 322 will be held in raised position so that even though the cam 317 be reciprocating it, the hook 322 will not engage with the hook 323 but will ride idly thereabove, until the hook 322 is lowered by the dropping of the projection 331 into the notch 333 when the disk 332 has been returned to original position.

The latter is effected by increment movements of the ratchet and connected parts, in a reverse direction from that above described when acting under the spring 338. This increment movement is effected from the shaft 294 which oscillates the crank 293. To this shaft is secured a sector gear 355 meshing with a sector gear 356 rotatably mounted upon a stud 357 fixed in the side wall 223. The sector gear 356 in turn meshes with a mutilated gear portion 358 integral with the pawl ring 336. The latter also carries an arm 359 to which is pivotally mounted a pawl 360 connected to a spring 361, in turn connected to an ear 362 forming a part of the ring 336. In the position of the pawl 360 shown in Fig. 41, the rear end of it engages with a release pin 363 adjustably connected in a depending arm portion 364 of the starting lever 351. The latter has a spring 365 connected to it and to a stud 366 fastened to the wall 323, this spring acting to normally hold the lever in stopped position with the pawl 332 in engagement with the ratchet teeth of the ratchet wheel 335.

From this description it will be apparent that when the shaft 294 is oscillated so as to give a reversal of edges to the nib point, the sector 355 will operate through the sector 356 to give a partial turn to the ring 336, which in turn will move with the arm 359 and pawl 360, the latter will become disengaged from the pin 363 and engage with the teeth of the ratchet 335. This will feed the ratchet one or more teeth forward for an increment angular movement of the unit and the disk 332, thus causing the notch 333a to approach toward the projection 331 on the arm 329. The teeth will slip under the nose of the pawl 352, and the latter will prevent the return of the ratchet. Upon the next oscillation of the shaft 294, a similar additional movement is given to the ratchet, and this continues for the number of times that the setting mechanism, as indicated by the graduations on the thumb nut 343, is marked. As soon as the notch 333a reaches the position 333, the projection 331 will drop into the same and the arm 329 lowered, so that the hook 322 will be in position to engage with the hook 323 of the clutch shifting bar 324. Then, as the cam 317 rotates to position to operate the lever 319, the latter will draw the hook 322 to the right as shown in Fig. 46 of the drawings, and hence cause the unclutching of the clutch. This brings the mechanism to a stop. The stopping of the mechanism is effected at the time when the nib holders are in raised position. The nib holder may then be removed, and the nib taken therefrom and a new nib inserted in place. The holders may then be placed in their respective chucks and the starting lever 351 depressed to start the mechanism again. When this is done the setting mechanism or the timing means automatically operates under the influence of the spring 338 to again set this mechanism at starting position, as above described.

If during the operation of the mechanism it be desired to inspect to what extent the side portions of the nib point be removed, the operator may depress the hand lever or arm 236 to bring the machine immediately to a stop. After inspection this lever or arm may be released, and the machine will again operate from the point where it stopped and complete its cycle of operation.

It is to be noted that during the operation of the timing movement by the oscillation of the shaft 294 from the cam 300, that as soon as the lobe of the cam passes from under the roller 301, so that the latter will ride upon the dwell of the cam, the sectors 355, 356 and 358 will return to original position, thus carrying the pawl 360 back to the position shown in Fig. 41 of the drawings, and ready for another pawling of the ratchet upon the next oscillation of the shaft 294. In the meanwhile the starting lever 351 has been retracted by the spring 365 so as to maintain the dog or pawl 352 in engagement with the teeth of the ratchet, this pawl no longer engages with the pin 353, the latter being held in raised position by reason of the projection 331 riding upon the periphery of the disk 332 until the latter has been rotated back by increments as above described, until the notch in the disk registers with the projection, when the lever 329 is permitted to drop.

The mechanism is suitably housed between the walls 223 and 266 by a housing 367 placed over such walls, and having forward wall 340 and rear wall 368.

After the nib has been operated upon in the mechanism above described for removing material from the side edges of the tip of the nib, the nib is then placed in a mechanism for notching the rear end thereof along a center line of the nib blank. This is performed in a mechanism such as that shown in Figs. 87 to 90 inclusive. This device comprises a base or supporting member 370 upon which is secured a plate 371 as by means of screws 372. Upon this plate is secured a platen 373 having slots 374 whereby the platen may be adjusted relative to securing screws 375. The platen carries a pin 376 adapted to project through the perforation 16 in the nib blank, when the latter is resting upon the platen upon its back. At the rear of the platen the block or plate 371 has a guide channel in which is slidable a block 377 carrying a pair of pins 378 spaced and located to engage the opposite edges of the point of the nib as clearly shown in Fig. 87.

These pins are equally spaced on each side of a center line so that when the same engages with the edges of a nib, these pins together with the pin 376 passing through the aperture in the nib, will centralize or move the nib in proper central relation. Upon the block is secured an abutment member 379 having an apertured flange 380 through which extends and is capable of sliding, a handle 381 having an upturned manual portion by which the same may be drawn back against the compression of a coil spring 382 reacting between the flange 380 and the block 377, the handle 381 being secured to the end of the block as clearly shown in Fig. 90. This block is withdrawn when the nib is placed upon the platen with the pin 376 in the aperture thereof, and then the block permitted to return under the influence of the spring for the pins 378 to engage with the tapered point of the nib so as to center the nib.

The plate 371 carries bearings 382 between which is located a circular cutter 383 having a beveled cutting edge 384 and a notch 385 cut in said cutting edge to provide a cutting tooth 386 which when the cutter is rotated will bring the tooth from the position shown in Fig. 89 downwardly to cut through the rear end of the nib and to produce a notch therein, to the position shown in Fig. 90 of the device.

The cutter is secured to a shaft 387 rotatably supported in the bearings 382. The shaft extends to one side of the bearings, and has secured thereto an operating arm 388 as by means of a bolt 389. The outer end of the arm is slotted to receive an actuating pin 390 secured to a plunger 391 slidable in a cylinder 392 secured at its lower end by means of a screw 393 to the base 370. The plunger is recessed to receive one end of a helical spring 394, the other end of the spring reacting against the lower end of the cylinder 392. The side of the cylinder is provided with a slot 395 for the reciprocation therein of the pin 390 as the plunger is depressed. The top of the plunger may have a knob 396 whereby the plunger may be manually operated or the knob may be acted upon by a suitable mechanical means, as desired. In the operation of this device, the nib is placed as above described, so that the tail end of the nib will be located in the space of the notch 385. The plunger 391 is then depressed against the compression of the spring 394 and the pin 390 caused to move downwardly so that it will work in the slotted end of the arm 388 to cause a rotation of the shaft 387 and cutter 383 so as to bring the nose or tooth 386 of the cutter into cutting engagement with the rear end of the nib. This will effect a notch in the rear end of the nib on the center line passing through the pin 376 and the medial plane of the pins 378.

If the nib being manufactured is made with high grade material and with a very hard point, the nib is then placed in a machine for removing material from the end of the tip and for squaring such tip. If on the other hand the pen is of cheaper material and with a relatively soft point, the nib may then be placed into a slitting machine for providing a slit before removing material from the tip of the point. The description of the machine for removing material from the point of the tip and squaring it will now be described.

This mechanism is shown in Figs. 54 to 62 inclusive and as comprising a supporting base 400 provided with a trough 401 connected to a drain outlet 402 for the carrying back of liquids and suspended particles such as grit and particles of gold and the like, to a common receptacle shown in Fig. 96. Upon the base 400 is mounted a pedestal 403 having upstanding arms 404 and 405 bored to receive bearing bushings 406 and 407 in which is rotatably supported a shaft 408. At one end of the shaft is secured a driving pulley 409 having an elongated hollow hub portion 410 secured at its outer end as by means of a set screw 411 to one end of the shaft 408. To the other end of the shaft is secured a similar hollow hub member 412 having a head 413 abutting against a shoulder 414 of the shaft 408. This end of the shaft has a reduced portion 415 carrying a core 416 upon which is mounted an abrasive member or grinding stone 417, the core and stone being held in place by means of a washer 418 and a securing screw 418ª. The grinding member may be surrounded by a housing 419 having a supporting wall 420 mounted upon and secured to the base 400, and a shield 421 carrying clips 422 adapted to snap over the edge of the wall 420, thus facilitating the easy removal and attachment of the shield over the grinding wheel.

To the shaft in the space between the arms 404 and 405 are secured spaced collars 423 and 424 as by means of set screws 425 and 426. In the space between the collars and surrounding the shaft is located a trunnion ring 427 carrying trunnions 428 pivotally connected to the slotted ends of arms of a yoke member 429. This yoke member is pivotally supported upon a pintle 430 rigid with a plate 431 secured as by screws 432 to a bearing 433 forming an integral part of the pedestal 403. The yoke has a depending arm 434 which is slotted to receive a block 435 pivotally connected to a crank pin 436 fixed to a crank disk 437 forming an end part of a shaft 438 rotatably mounted in bearing bushings 439 in the bearing 433. To the other end of the shaft 439 is secured a grooved pulley 440 over which may run a belt for driving the mechanism.

The rotation of this pulley and the shaft 438 causes, by way of the crank pin 436, a reciprocation or oscillation of the arm 434 and a reciprocation of the yoke member 439. This causes an axial reciprocation of the shaft 438 while the same is being rotated by way of the pulley 409. This will prevent the wearing of a groove in the surface of the grinding stone 417 but will distribute the wearing thereof over the entire periphery, owing to the reciprocation of the stone being effected at the same time that it is being rotated.

In order to prevent entry of grit, water, particles of gold and other materials, into the bearing surfaces between the shaft 408 and the bearing bushings 406 and 407, it will be noted that the latter are elongated and telescoped with the hollow members 410 and 412, the latter rotating relative to the bushing. The bushings are secured in the arms 404 and 405. It will also be noted that the length of the hollow members 410 and 412 is sufficient to permit the reciprocation thereof relative to the bushings, as the shaft is axially reciprocated therewith. A housing 441 may be provided over the arms 404 and 405 to house the reciprocating mechanism therebetween to protect the same from entry of foreign matters.

Extending forwardly from the pedestal 403 are provided integral brackets 442 upon which is supported in adjustable relation a table 443. Each bracket has a track element 444 fixed thereto and adapted to be received in a groove formed in the bottom of the table. The table may be provided with slots 445 for receiving tightening screws and nuts 446, the slots permitting a certain amount of longitudinal movement of the table and the tightening means 446 serving to secure the same in adjusted position.

One end of the table extends to a position in front of the grinding stone and supports a grooved track 447 in which is slidably located a block 448 having a depending end flange 449 through which is threaded a stop screw 450. The end of this screw is adapted to contact with the end of the member 447 to limit the inward movement of the block 448. The screw may be held in adjusted position by a lock nut 451. Upon the forward end of the block 448 is secured a nib supporting plate 452 as by bolts or screws 453. This plate, at its forward end, has a rising lip 454 upon which rests the point portion of the nib. The plate 452 may also have upwardly extending pins 455 and 456 which respectively project through the aperture 16 and the notch 19 formed in the nib blank. These pins are arranged in a medial plane so that by projecting through these apertures and notches, the nib blank is held in centered position so that the end of the point will be presented square upon the surface of the grinding member 417.

The set screw 450 is set for the particular length of nib used and also for the particular amount of material to be ground from the tip of the point. The block is slipped backward and the nib placed in position as clearly shown in Figs. 56 and 58 so that the pins 455 and 456 will project through the aperture 16 and notch 19, and then the block 448 is moved forwardly to present the tip of the point to the periphery of the grinding wheel. This is slowly fed in until the end of the stop screw 450 engages with the end of the member 447. This will limit the amount of grinding and thus gauge the squaring effect of the tip of the point. When thus ground the block 448 is again withdrawn and the nib blank removed.

The nib may now be placed in the machine for providing a slit longitudinally thereof from the tip point to the aperture 16. Such a machine is shown in detail in Figs. 63 to 69 inclusive. It is shown as comprising a supporting base 460 provided with a trough 461 leading to a drain outlet 462. Upon the base 460 and rigid therewith is a supporting member 463 having upstanding arms 464 and 465 at the upper ends of which are provided bearing means for a shaft 466 to which is secured a grooved pulley 467 as by set screws 468. One end of the shaft has a reduced portion 469 to which is secured a tapered bearing element 470 as by means of a washer and screw 471 and 472, the latter being threaded into the end of the shaft. Cooperating with the bearing element 470 is a tapered bearing element 473 held in a shouldered bore 474 in the arm 464. At each end of the bore 474 are closure members 475 and 476 secured to the arm 464 by means of bolts 477 passing therethrough as shown in Fig. 66. The closure member 476 surrounds the shaft 466 and is hollow to receive packing material 478 which may be of felt or the like.

The other end of the shaft also has a reduced portion 479 to which is secured a tapered bearing element 480 in bearing cooperating with a stationary bearing element 481 set in a shouldered bore 482 provided in the upper part of the arm 465. Closure members 483 and 484 close the ends of the bore 482 and are held to the arm 465 by means of securing bolts 485 passing therethrough. The member 484 is also hollow for holding packing 486, such as felt and the like, for surrounding the shaft. The member 483 may also have a packing groove 487 for packing surrounding a bushing 488 threaded to a threaded part 489 of the shaft beyond the portion 479. The bushing 488 acts as a washer and has secured to it an oil or liquid casting ring 490 having ridges and grooves capable, when the member 490 is rotated, of slinging any foreign matter that may come in contact therewith. These grooves and ridges may be helical so that they will have a tendency to feed the foreign material away from the bearings. This structure is for the purpose of preventing the entry of foreign material to the bearing surfaces of the bearing elements 480 and 481. The packing will also aid in this respect and the closure means of the other bearing will also prevent entry of the foreign matter in the bearing elements 470 and 473. Should the bearings become worn, adjustment may be made by adjusting the bushing 488.

The shaft has a further reduced portion 491 fitting into the bushing 488 and projecting beyond the same to receive a pair of clamping plates 492 and 493 which are secured in place by a washer and nut 494 and 495, the latter being threaded to the threaded end of the shaft portion 491. Between the plates 492 and 493 is clamped a thin metallic disk 496 which acts as the element for forming the slit in the nib. This disk is very thin and is approximately about five thousandths of an inch in thickness and may be made of soft metal, such as copper, or compositions thereof, or the like.

Beneath the disk is rotatably supported a felt roller or disk 497 which is clamped between a plate 498 and the flange of a hub member 499, the two members 498 and 499 being secured together by bolts 500. These members 498 and 499 are secured to an end of a shaft 501 which is rotatably mounted in a bearing bushing 502 fixed into a bored portion 503 forming a part of an arm 504 pivotally supported upon a supporting post 505 fixed to the base member 506. The bushing 502 extends for a substantial distance along the shaft 501 and is surrounded by a hollow sleeve 506 forming an integral part of the member 499. The outer surface of this sleeve is provided with a helical groove 507 the pitch of which is such that any foreign material contacting therewith will be fed away from the bearing surfaces of the shaft and bearing bushing and discharge such material into a pan or trough 508 located beneath the felt wheel or roller 497. In this pan may be placed an abrasive mixture in the form of a paste, such as emery powder and oil or the like, whereby the roller 497 may take up this material and present a film on the surface of the roller 497 in a position to be taken up by the peripheral edge of the disk 496. Normally the roller 497 is spaced away from the periphery of the disk 496 by means of a spring 509 connected to the arm 504 and a lug 510 forming a fixed part of the base 460. The arm 504 is in the form of a lever having an arm 511 extending rearwardly and connected by a link 512 which in turn is connected to the foot pedal 513 fulcrumed upon a support 514 upon the floor. The other end 515 of the pedal may be engaged by the foot of the operator when it is desired to operate the lever 504—511 to raise the mechanism with the roller 497 toward the peripheral edge of the disk 496. The amount of this movement may be limited by a stop screw 516 adjustably threaded in a post 517 forming a fixed part of the base 460. The screw 516 may be held in adjusted position by a lock nut 518. This screw is adjusted in such position that the roller 497 will be proximate to the peripheral edge of the disk 496 and yet not touch the same. This is a position where the film of paste upon the surface of the roller 497 will be in position to adhere to the edge of the disk 496. This paste will then be carried around with the disk and together with the edge thereof will perform the operation of cutting a slit in the nib blank.

At the front of the posts or arms 464 and 465 are provided bosses 519 and 520 in which are vertically adjusted posts 521 and 522 carrying a sliding bar 523 which may be moved in position in front of the disk and act as a tool rest when dressing the edge of the disk, should the same be bent or curved. Set screws 527 and 528 may be used to hold the posts 521 and 522 in adjusted position, and similar screws 529 and 530 may also hold the tool rest bar 523 in position.

Forwardly of the disk and secured to the base member 460 as by a screw or bolt 531 is a block 532 upon which is rotatably mounted a swivel base 533 adapted to swivel about a vertical axis and about an upstanding stud 534 of the block 532. The swivel base 533 may be secured in adjusted position by a lock or clamping nut 535 which carries a handle 536 by which the clamping means may be manually adjusted. The ends of the swivel base are provided with pivot sockets 537 and 538 in which are pivotally mounted the ends of pivots 539 and 540. These pivots are secured to and carried by spaced arms 541 and 542 of an I-shaped beam 543. This beam is capable of angular movement about a horizontal axis, passing through the pivots 539 and 540. It may be held in adjusted angular relation by means of a link 544 pivotally connected to the beam 543 and passing through an aperture in an upstanding arm or post 545 integral with the swivel base 533. This link may be threaded to receive an adjusting thumb nut 546. A stop pin 547 may also be provided for limiting the position of the beam 543. The latter abuts against the end of the stop pin 547, the latter being threaded through a threaded aperture in the post 545 and adapted to be adjusted by a thumb nut 548 thereon.

The beam 543 has upwardly extending arms 549 and 550 in which are secured, in alinement, pivots 551 and 552. These pivots as well as pivots 539 and 540 may be adjusted axially by screws 553 and 554 in the same way as above described in connection with adjustment of pivots 86 and 87 specifically shown in Fig. 29 of the drawings. It is believed unnecessary to repeat the specific description of this detail.

On the pivots 551 and 552 is rotatably mounted an arbor 555 to which is adjustably connected the hub 556 of a nib holding device 557. The hub 556 may be axially adjusted by means of a screw 558 passing through ears 559 and 560 and having a collar 561 operating between said ears. The ears 559 and 560 are integral with the hub 556. The screw also operates through a nut 562 fixed to an ear 563 integral with the arbor 555. A thumb nut 564 may be used to rotate the screw to adjust the holder axially of the arbor 555.

Referring more in detail to Figs. 68 and 69, the nib is supported upon an arbor 555 secured in any suitable manner to the holder element 557, as by way of rivets. The forward end portion 565a of this arbor is rounded and is provided with a slot 566 into which the slitting edge of the disk 496 may enter when slitting the nib point. On each of the arms on each side of this slit are upwardly extending projections 567, the inner faces 568 of which are inclined to the axis at an angle substantially the same as the edges of the nib point.

The rounded portion 565a of the arbor also has a transverse pin 569 upon which the lateral edges of the nib may rest when the nib is placed upon this rounded portion. A second slot 570 may be provided in the rounded portion 565a for the projection therethrough of a spring 571 which has one end thereof pressing in the notch 19 of the nib blank. This will press the nib forward with the point thereof in engagement with the inclined surfaces 568 and thus center the nib in proper position. The other end of the spring 571 reacts against a shoulder 572 provided at the rear end of the slot 570.

To aid holding the nib in place, there may be provided a pressure lever 573 having its forward end bent to press upon the back of the nib and being pivotally supported upon the member 557 in any suitable manner. A spring 574 may be connected to the rear end or finger portion 575 of this lever and a post 576 fixed to the upper part of the member 557. This is clearly shown in Fig. 65.

A guard or shield 577 is supported upon the fulcrum of the lever 504 and surrounds the disk 496, a part of this shield also extending forwardly of the disk beneath the nib holder and connected to a part of the base 460, also as clearly shown in Fig. 65.

In the operation of this device, the operator presses upon the end 575 of the pressure lever and at the same time swings back the holder about the pivots 551 and 552 so as to raise the holder in position for the insertion of the nib blank. Pressure upon the arm 575 of the lever will release a previously inserted nib, which may be removed and an unslitted nib may then be placed upon the rounded part 565a. This is placed with the point of the nib between the projections 567 and the side edges of the nib body resting upon the projecting ends of the pin 569, and with the rear end of the nib engaging the spring 571 so that the upper end thereof will press in the notch 19 provided in the rear end of the blank. The spring will urge the blank forwardly so that the inclined sides 568 of the projections 567 will engage the inclined edges of the nib point so as to center the nib in proper position for presenting to the periphery of the splitting disk. The operator next swings the holder back toward the disk after releasing the pressure lever 573, and presents the point of the nib to the edge of the disk 496. In the meanwhile the operator has operated the foot lever or pedal 513 to draw down the link 512 and arm 511 so as to lift or raise the arm 504 with the felt roller 497 until the arm 511 contacts with the limit stop 516. This brings the periphery of the felt roller 497 in close proximity to the peripheral edge of the disk 496, so that the film of abrasive paste or fluid carried by the roller may be taken up by the edge of the disk 496, this action also inducing a rotation of the roller 497 so that it may pick up further abrasive material contained in the pan 508.

The abrasive carried around the edge of the disk 496 acts upon the tip of the pen and will cut a slit therein as the peripheral portion of the disk enters in this slit until the slit reaches the aperture 16, when the slitting operation is completed.

In order that the downward swinging of the nib holder may be limited so that the pen nib will not be lowered too far and the slit made too long, a limit stop means is provided comprising a bracket 578 secured as by screws 579 to the holder member 557, and having an arm portion 580 in which is adjustably carried a stop screw 581 adapted to contact with the rear surface of the beam 543. The screw 581 may be held in adjusted position by a lock nut 582.

The beam 543 may be adjusted to angular position such that the tip of the nib may be presented at the proper angle to the cutting edge of the disk. Inasmuch as this disk is of very thin and more or less soft metal, such as copper or compositions thereof, the edge of the same might become slightly spun or bent so that the presenting of the tip of the nib may not necessarily be in a plane of the disk but should be presented slightly at an angle so as to be presented at a normal to a tangent plane of contact. For this reason the adjustment about the vertical axis of the slot 532 is provided. When the bending or the spinning of the edge of the disk 496 becomes too much, the same may be dressed or bent back into proper shape by presenting a tool of any suitable construction which may be made to rest upon the tool rest bar 576, the latter being slid into position in front of the disk for this purpose. Also, in order that the point of the nib may be slitted in a medial plane or along a center line thereof, the holder may be adjusted by the operation of the screw 558 so as to adjust the holder axially of the axis of the arbor 555.

As previously stated, this slitting operation may occur for the comparatively soft points before the squaring or grinding of the material at the very tip of the point, or when operating upon nibs of hard points the slitting is preferably effected after the squaring of the tip of the point.

After the slitting and squaring operation has been effected, the nib is then placed in a mechanism for finishing the point so that the same may have rounded edges and corners, this mechanism being generally referred to as the finishing machine. Such a mechanism is shown in Figs. 70 to 86 inclusive of the drawings. The same comprises a base member 585 having a channel or trough 586 leading to a drain outlet 587 for carrying foreign material and liquids to a collecting receptacle as shown in Fig. 96.

At the rear portion of the base are secured, by any suitable means, posts 588 and 589 in which is rotatably mounted a bushing or hollow shaft 590, the ends of which extend beyond the posts. To these projecting ends of the hollow shaft are connected arm portions 591 and 592 of an I-shaped beam 593 so that the latter may be capable of angular movement about the axis of the shaft 590. This beam also has upwardly extending arms 594 and 595 in which are rotatably mounted shafts 596 and 597. These shafts 596 and 597 are in telescopic engagement with sleeves 598 and 599, these elements being splined or similarly connected so that they will rotate together. The sleeves 598 and 599 carry taper pins 600 and 601 in engagement with couplings or chucks 602 and 603 connected to and carrying an abrasive member or grinding stone 604. This structure is similar to that shown more in detail in Fig. 34 of the drawings.

To the shaft 597 are secured pulleys 605 and 606 of different sizes for giving different rates of rotation to the grinding stone. These pulleys have a hub 607 secured to the end of the shaft 597 by means of a set screw 608 or the like. The shafts, above mentioned, together with the connected parts, are capable of longitudinal axial reciprocation while the same is being rotated, the means for producing this being later described.

The beam 593 may be held in adjusted angular position by a connecting link 609 pivotally connected to a pin 610 secured to the beam 593, and extending through an aperture in an upstanding post 611 preferably formed integral with the post 589. The link 609 is threaded to receive a thumb nut 612 adapted to react against the post 611 for effecting an adjusting of the link 609 and beam 593. In aid of this adjustment is also provided a limit stop or abutting screw 613 threaded through the post 611 and having its abutting end 614 in abutting engagement with the rear surface of the beam 593. A helical spring 615 may surround the same and react between the beam 593 and the post 611 as clearly shown in Figs. 72, 73, 74 and 75 of the drawings.

Upon the beam 593 may be mounted a guard 616 preferably of sheet metal, and having a hood portion 617 surrounding a part of the grinding member, the lower part of the shield being connected by hooks 618 to the hollow shaft or bushing 590. See Fig. 72 of the drawings. Similar hooks 619 passing through suitable ears 620 on the beam 593 may also slidably and resiliently hold part of the guard through springs 621.

At the forward portion of the base member 585 are mounted spaced walls 622 and 623 forming part of a casing having front and rear walls 624 and 625 and a cover or top 626. To the wall 622 is rigidly secured a gear housing or casing 627 in which is rotatably mounted a driven shaft 628 in bearings 629 and 630 preferably forming an integral part of the wall 622. The rear end of this shaft carries a worm 631 meshing with a worm gear 632 secured to a shaft 633 rotatably mounted in the hollow bushing or shaft 590. The shaft 628 is supported in bearing bushings 634 on either side of the worm 631 and in a gear housing 635 forming an integral part of a support 636 secured to the base 585.

The shaft 633 extends through the hollow shaft 590 and projects beyond the depending arm 591 of the beam 593 and has secured to that end of the shaft 633, a cam 637 as by means of a cross pin 638 or the like. This cam 637 has an oblique groove 639 cooperating with a cam roller 640 rotatably connected to the lower end of a lever 641 fulcrumed upon a bracket 641ᵃ fastened to the end of the beam 593. The upper end of the lever 641 has a yoke member 642, the arms of which rotatably receive trunnions 643 of a trunnion ring 644 loosely mounted upon a reduced diameter portion 645 of the shaft 596, this part of the shaft projecting beyond the arm 594 as clearly shown in Figs. 70 and 71 of the drawings. The trunnion ring is located between washers 646 and collars 647, the latter of which are secured to the shaft 645 by means of cross pins or the like. A locking collar 648 may also be secured to the end of the shaft 645 in a similar manner.

This mechanism may be protected from entry of foreign matter by a housing 649 preferably of sheet metal and releasably attached to the brackets 641ª as clearly shown in Figs. 70 and 71.

From this construction it will be apparent that rotation of the shaft 628 will operate through the worm 631 and gear 632 to rotate the shaft 633. This in turn causes a rotation of the cam 637 which will produce an oscillation in the lever 641 and yoke member 642 operating through the trunnion ring 644 to give the abrasive member and connected mechanism an axial reciprocation. This reciprocation is effected so that the grinding member will not wear in grooves but that any wear that might occur may be distributed over the surface of the abrasive element.

The gear casing 627 has a bearing part 650 in which is secured a bearing bushing 651 for rotatably supporting a shaft 652, this shaft extending within the casing 627 and having secured to it a spiral gear 653 in mesh with a similar gear 654 fixed to the shaft 628. Loosely mounted upon the shaft 652 is a grooved pulley 655 to which is secured a clutch member 656 adapted to cooperate with another clutch element 657 splined to the shaft 652. The clutch element 657 carries a trunnion ring 658, the trunnions 659 of which operate in the slotted upper ends of yoke arms 660 forming an integral part of the yoke hub 661 secured to a shaft 662 rotatably mounted in bearings 663 of a supporting bracket 664 fastened to the base member 585. The casing 627 also has a bearing part 665 in which is secured a bearing bushing 666 for rotatably supporting a shaft 667 upon which is loosely rotated a grooved pulley gang 668 of various sized pulleys, any one of which may be driven for different speeds of rotation. To this pulley gang 668 is secured a clutch member 669 as by bolts or the like 670. This clutch element cooperates with a similar element 670 splined to the shaft 667. The clutch member 670 carries a trunnion ring 671, the trunnions 672 of which operate in the slotted upper ends of yoke arms 673 formed integral with yoke hub 674 secured to the shaft 662. The end of the shaft 662 projects beyond the hub 674 and has secured thereto a collar 675 having an upwardly projecting pin 676 disposed between the ends of adjusting screws 677 threaded into lugs 678 secured to the opposite sides of one of the yoke arms 673 as clearly shown in Figs. 70 and 74 of the drawings. The adjusting screws 677 may be adjusted to vary the position of the pin 676 and hence effect a slight angular adjustment of the shaft 667 with respect to the clutch member 670 carried by the yoke arms 673, so that the clutching of the clutch members may be effected in correct time relation with the clutch member attached to the pulleys. Suitable lock nuts may be used to hold the adjusting screws in adjusted position.

Integral with yoke hub 661 is a depending arm 680 pivotally connected at its lower end to an adjustable link 681 secured to a slide bar 682 slidably mounted in the wall 622, the inner end of the bar 682 being provided with a hook 683. The bar 682 also is provided with a shoulder 684 between which and a boss 685 of the wall 622, reacts a helical spring 686, the latter normally acting to hold the bar 682 in position whereby the clutches may be thrown into engagement and maintained in engagement with the clutch elements connected to the pulleys. The hub 661 may also have attached thereto a handle 687 which may be manually operated at any time during the operation of the machine to temporarily stop the operation thereof, the machine then continuing its cycle of operation from the point of stopping after the release of this handle.

Within the casing 627 and secured to an end of the shaft 628 is a worm 688 adapted to drive a worm gear 689 secured to an end of a shaft 690 rotatably supported in the walls 622 and 623 and extending therebetween. The bearings for this shaft include bearing bushings 691 and 692 secured in said walls. Fastened to this shaft 690 near the end in the wall 623, is a cam 693, as by means of a set screw 695. This cam cooperates with a cam roller 695 rotatably mounted on a bell crank lever 696 having a hub 697 secured to a shaft 698 rotatably supported in bearing bushings 699 and 700 carried by the wall 622 and 623 as clearly shown in Fig. 71. A rearwardly extending arm of the lever 696 has a slot 701 in which is slidable a crosshead 702 carrying a pin 703 extending into a similar crosshead 702a slidable in slot 704 provided in an arm 705 having a hub 706 secured, as by a cross pin 707, to a hollow shaft 708 suitably supported in bearing bushings in the walls 622 and 623. It will be seen from the above that as the cam oscillates the lever 696 the latter will also oscillate the arm 705 and the hollow shaft 708. The extent of oscillation of the latter may be varied by slidably adjusting the crossheads 702 and 702a with the pin 703. The latter is provided with an adjusting thumb nut 709 for securing the parts in adjusted position as desired. A link 710 may be pivotally connected to the arm 705 and extend into a cylinder 711 including a helical spring 712 reacting against the head of the cylinder and a piston 713 secured to the link 710. The lower end of the cylinder 711 may be pivotally connected to lugs 714 forming an integral part of the base 585 or a part fixed thereto. In this way the spring 712 normally acts to urge the lever mechanism with the roller 695 in constant engagement with the cam 693.

The shaft 708 extends beyond the wall 623 and has secured thereto as by means of set screws 715, a carrier 716. See particularly, Figs. 83 and 84. This carrier extends upwardly and has bearings for rotatably supporting a shaft 717 to which are secured a number of spiral gears 718 meshing with gears 719 secured to shafts 720 rotatably mounted in bearing bushings 721 secured in slots 722, each comprising disks 723 and 724 secured together by securing bolts or screws 725. The shaft 720 may be adjusted axially and held in adjustment by adjusting nuts and lock nuts 726 and 727. One end of the shaft 717 may have secured to it a gear 728 meshing with a gear 729 rotatably supported upon a stud 730 secured to the carrier 716, and in turn meshing with a gear 731 secured to an end of a shaft 732. This shaft 732 is rotatably mounted in the hollow shaft 708 and extends beyond the same and the wall 622 where it has secured thereto a gear 733 meshing with a gear 734 secured to the inner end of the shaft 667.

The shaft 720 extends toward the rear and has a chuck socket 735 for receiving a shank portion 736 of a nib holder 737 shown in detail in Figs. 85 and 86. The carrier may have a shield or guard 738 secured at the top thereof by screws 739 and having a flanged portion 740 surrounding the socket 735. The latter may carry a shield or guard 741 with a flange overhanging the flange 740. This will guard against the entry of foreign matter, such as grit, particles of gold, liquids and the like into the bearings for the shaft 720 and other parts in the carrier.

From this construction it will be apparent that when the pulleys 668 are rotated, they will drive through the shaft 732 and gears 731, 729 and 728 to the shaft 717 and thence through the gears 718 and 719 to the shaft 720 which will rotate the nib holders 737 continuously during the operation of the machine. At the same time the shaft 652 will be driving through the gear 653, gear 654, worm 688, worm gear 689 and shaft 690. The latter will rotate the cam 693 to cause an oscillation of the levers 696 and 705 which in turn causes an angular movement of the hollow shaft 708 and the connected carrier 716 so as to give an angular movement about the axis of the shaft 708 of the carrier and parts carried thereby, such as the nib holders 737. This is effected at the same time as the nib holders are being rotated. The motion is a compound motion such that the tip of the nib will travel in a curved path in the rotating surface of the grinding member 604. The rotation of the nibs will cause the grinding member to remove material from the corners and edges of the tip as well as from the corners at the very point of the tip. In this way the nib tip is being rounded and finished smooth.

Figure 72:
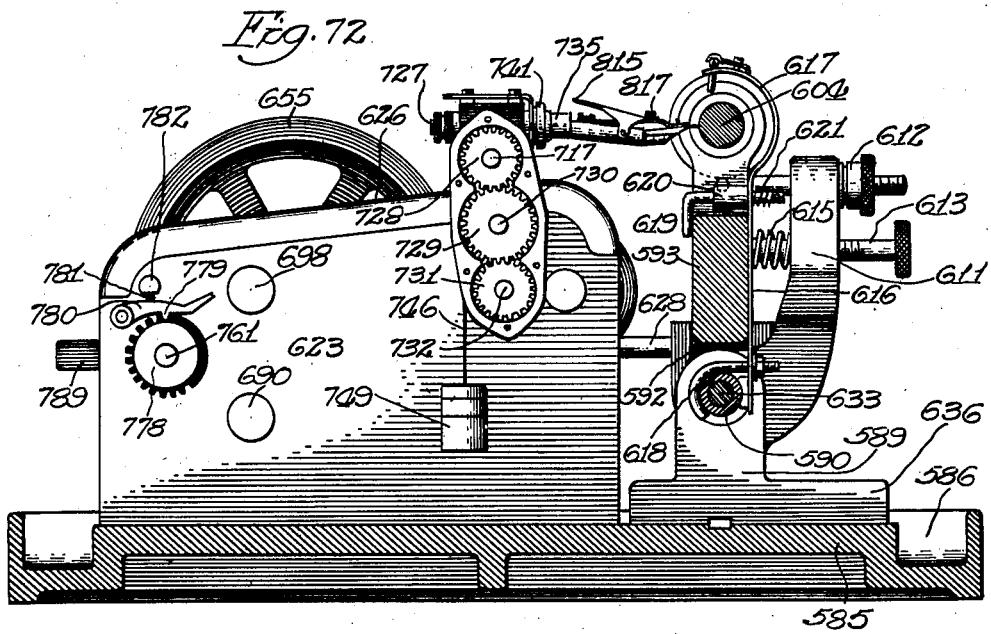
Fig. 72 is a transverse sectional view taken in a vertical plane represented by line 72—72 in Fig. 70.

It will be noted that the blocks 722 are loosely mounted upon the shaft 717 and capable of being adjusted angularly thereabout. This is for the purpose of adjusting the starting position of the tip of the nib so that it will not be at too low a point and will be in the relation as shown in Fig. 72 of the drawings. This position may be limited by a stop screw 743 adjustably threaded in a lug 744 forming an integral part of the carrier 716, the end of the screw cooperating with a lug 745 formed integral with each block disk 723. As the point of the nib is presented to the surface of the grinding wheel, by reason of the action of the shaft 708 from cam 693, and with the grinding wheel rotating in a clockwise direction as viewed in Figs. 72 and 73 of the drawings, the friction thereof on the nib point will have a tendency to draw the nib in that direction and cause the same to mount the curved surface of the grinding wheel. This will cause a rocking of the blocks with the holders 737 about the axis of the shaft 718. During this movement the lugs 745 will separate from the adjusting screw 743. To cause a return movement thereof, the blocks 722 have connected thereto cords 746 passing over idlers 747 rotatably mounted upon pins 748 fastened to the carrier 716, the lower ends of the cords 746 being connected to counterweights 749.

The operation above described may be effected from a starting position of the nib as shown in Fig. 72 whereby the same is caused to move upwardly over the surface of the grinding member while the nib is being rotated, and return again to the same position. The machine may then be brought to a stop. If desired, this operation may be repeated any number of times before the machine is automatically brought to a stop. Timing mechanism for this purpose is therefore provided and controlled by the mechanism to stop the machine after any number of times the nibs have been caused to move to and from the position shown in Fig. 72. The timing mechanism referred to is similar to that disclosed in connection with the mechanism shown in Figs. 32 to 53 of the drawings.

Figure 73:
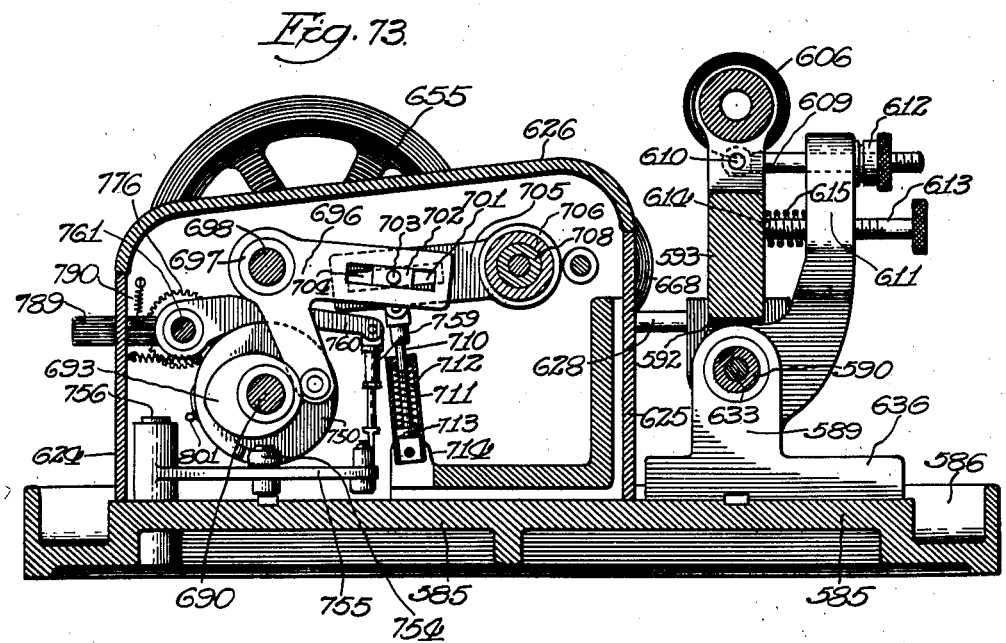
Fig. 73 is a transverse sectional view taken in a vertical plane represented by line 73—73 in Fig. 71.

The means for bringing the mechanism to a stop comprises a cam 750 having a hub 751 secured to the shaft 690 as by a set screw or the like 752, the cam also carrying a lobe 753 adapted to coact with a cam roller 754 rotatably carried on a lever 755 fulcrumed upon a stud 756 fastened to the base member 585, see Fig. 73. The other end of the lever 755 has pivotally connected to it a strap 757 which in turn is pivotally connected to a hook 758 adapted to engage the hook 683 when the hook 758 is in lowered position. To the hook 758 is connected an adjustable link 759 which in turn is pivotally connected to a lever 760 rotatably mounted upon a shaft 761, the latter having bearings in the walls 622 and 623. The lever 760 has a hub 762 and is held in proper position on the shaft 761 by a collar 763 secured to the said shaft. Spaced guiding pins 764 may be secured in the base 585 and located on opposite sides of the member 758 so as to guide the same in its movements both longitudinally and upwardly and downwardly. The lever 760 carries a projection 765 which is adapted to ride upon the periphery of a disk or cam 767, and when the cam 767 is rotated in the proper position, it may drop into a notch 768 provided in said cam. This disk 767 is secured to a grooved sheave 769, and a ratchet wheel 770 by means of connecting screws or the like 771. These three elements are united together to form a single unit adapted to rotate in unison and loosely upon the shaft 690. The ratchet wheel 770 has a hub upon which is rotatably mounted a pawling ring 772, details of which will be later explained. Upon the grooved pulley 769 and secured to it is a spring 773, with the end of the spring extending rearwardly and being connected to a stud 774 secured to the front wall 674 of the casing. It will be thus seen that this ring normally urges or tends to rotate the disk and the other parts of the unit in a counterclockwise direction as viewed in Figs. 76, 77, and 78 of the drawings. When the mechanism is in non-operative position this rotation is prevented by reason of the projection 765 extending into the notch 768 of the disk 767. Adjacent to the ratchet wheel 770 is rotatably mounted a gear 775 loosely upon the shaft 690. This gear meshes with gear 776 secured to the shaft 761 supported in bearings in the walls 622 and 623. The other end of the shaft extends beyond the wall 623 and has connected to it a graduated and notched thumb nut 778, with the notches of which is adapted to cooperate the tooth of a spring-pressed pawl 780 acted upon by a spring 781 reacting against a stud 782 fixed to the side wall 723. The knob of thumb nut may be turned to any desired graduated position and for example we will assume that it is turned to the fourth notch for producing an effect of four operations of the nibs upon the grinding element before the machine is brought to a stop. In the position shown in Fig. 72 the same is set at the first notch.

The ratchet wheel 770 carries a laterally extending lug 783 adapted to engage with a pin 784 secured into a hub 785 of the gear 775. From this it will be seen that when the gear 775 is rotated as in a counterclockwise direction as viewed in Figs. 76, 77, 78 and 80, that the pin 784 will be moved from the full line position shown thereof in Fig. 80 to a position shown in dotted line thereof and designated 785a. Also assuming that the lever 760 is raised, which will be later explained, the spring 773 will operate through the sheave 769 and the connected parts, to rotate the ratchet 770 until the lug 783 contacts with the pin 785a. The projection 765 of the lever 760 will then ride upon the periphery of the cam disk 767, and the notch 768 will be in the position 768a shown in dotted lines in Fig. 76.

As above stated, normally when the operation of the mechanism is stopped, the lever 760 is in lowered position with the projection 765 in the notch 768. The raising of the lever will now be explained.

Upon the shaft 761 is rotatably mounted a lever 787 having at one end thereof a pawl 788 adapted in the normal position to engage with the teeth of the ratchet 770 and also having an outwardly extending handle 789 for manual operation. The lever is held in normal position by a spring 790 connected to a stud or pin 791 fixed to the side wall 622. Above the pawl portion of the lever 787 is located a pin 792 secured in the lever 760. It will thus be seen from the above that when the operator presses down on the handle 789 of the lever 787, the pawl 788 will be disengaged from the teeth of the ratchet 770 and at the same time will engage the pin 792 and cause a raising of the lever or arm 760, thus disengaging the projection 765 from the notch 768 and also operating through the link 759 to raise the hook 758, so that if the latter is oscillated by the cam 753 it will operate idly and will not engage with the hook 683. It will be noted that the engagement of the hook 758 with the hook 683 is only possible when the hook 758 is in lowered position and is reciprocated by the cam 753.

Assuming the parts to have been released as above mentioned, and the apparatus operating, and with the notch 768 in the dotted line position 768a, the return of the disk 767 is effected by an increment movement during each operation of the mechanism for moving the carrier and the nib holders to and from normal position shown in Fig. 72. In other words, if the timing mechanism be set at notch four, there will be four increment movements of the disk 767 to bring the notch back to the position 768 so that the lever 760 may drop and bring the hook 758 in position with the hook 783 to be engaged thereby when the cam 753 moves the hook 758 and hence draws the bar 678 and throws the clutches out of engagement or operation. This mechanism is operated by the shaft 698 to which is secured the sector gear 795, the teeth of which mesh with a mutilated gear part 796 of the pawling ring 772, so as to give the same an angular oscillating movement. The ring 772 carries an arm 797 to which is pivotally mounted a pawl 798 connected by a spring 799 also connected to an ear 800 integral with the ring 772. In the normal position of the parts, the pawl 798 engages at its rear end, which has an inclined surface, with a pin 801 secured in the side wall 622. When the cam 693 operates through the arm or lever 696 to rock the carrier 716, it also angularly oscillates the shaft 698 and hence the sector gear 795. This in turn will cause a turning of the ring 772 and carry the pawl 798 away from the pin 801, and the spring 799 will immediately act to bring the nose of the pawl 798 into engagement with the teeth of the ratchet wheel 770, and thus give the same an increment of movement in a clockwise direction as viewed in Figs. 76, 77 and 78, and in a counterclockwise direction as viewed in Fig. 79 of the drawings. The teeth of the ratchet will slip under the nose of the pawl 788. As the cam 693 continues to rotate so that the reverse movement of the lever 696 is effected with the shaft 698, a similar reverse movement of the sector gear 795 will be effected, and the ring 772 returned to normal position with the pawl 798 in engagement with the pin 801. This completes one of the increment movements of the release mechanism. If the time-adjusting means were set at Number one notch, this movement would be sufficient to bring the machine to a stop. If, however, as assumed above, the adjusting of the member 778 be at notch Number four, it will be apparent that four pawlings of the ratchet will be necessary to bring the notch 768a from the dotted line position to the position 768. When this is effected the lever 760 will drop with the projection 761 in the notch 768 when the hook 758 is lowered as above described and the cam 753 will then draw the hook 758 to also draw the bar 762 and throw the clutches out of operation. This brings the machine to a stop. After new nib blanks are placed in the holders for further operation, the machine may again be started by simply pressing down upon the lever arm 789 and immediately the unit comprising the disk 767, sheave 769 and ratchet 770 will rotate until the projection 783 contacts with the pin 785 in the position 785a. The lever 787 may then be permitted to return to position where the pawl 788 may engage with the teeth of the ratchet 770 as shown in Fig. 78. The operation will be repeated as before.

From the above it will be seen that the grinding member is rotated continuously, and assuming that the nib has been placed upon the holders, and the machine started, the clutches will throw in operation the driving mechanism so as to operate the carriage or carrier 716 and cause the same to oscillate. At the same time the mechanism for rotating the nib holder 737 will continuously rotate the same. Also, at the same time, as the point of the nib is presented to the surface of the grinding member, the holder supporting means pivotally mounted upon the carrier as upon shaft 718, will have an angular movement thereabout so that the point of the nib will have the compound movement above described.

Reference will now be made to the nib holder shown particularly in Figs. 85 and 86. This holder comprises a body portion 737 and a shank 736. It will be noted that the body portion is disposed at an angle to the axis of the shank and has at its forward end a nib seat 805 upon which the nib may be placed. This seat preferably has a pin 806 adapted to extend through the aperture 16 provided in the nib blank. The rear end of the nib may engage with a shoulder 807 on the body portion 737. It will also be noted that the seat 805 is at an angle to the axis of the shank 736 and also at one side of the same although so positioned that the tip point of the nib will be substantially at a point in the axis of the shank 736. The purpose of this is such that when the holder is being rotated that the under side of the tip point of the nib will be positioned with reference to the grinding surface of the wheel as to cut or grind away a greater amount of material to form a more rounded curve as designated by the numeral 808 in Figs. 85 and 23 of the drawings. Then when the holder is in the opposite position so that the top corner of the point is presented to the wheel such as the corner 809, the same may be rounded without grinding away too much material. In this way the rounding of the point may be properly effected.

For the purpose of holding the nib in position upon the seat 805, a spring 810a is provided which is secured at its rear end to the body member 737 as by means of screws 810 and has its forward end bent to press downwardly upon the back of the nib. It also may be provided with a slot 811 for the projection therethrough of the pin 806. For the purpose of readily inserting the nib beneath this spring, the spring may be lifted by a lever 812 having ears 813 pivotally connected to a cross pin 814 extending through the body 737 of the holder. The rear end of the lever has a finger piece 815 by which the operator may depress the lever, and the forward end of the lever is provided with a slot 816 through which extends a headed connecting pin 817. This pin has a certain amount of loose play, with the heads thereof disposed on opposite sides of the spring 810a and the forward end of the lever 812, the pin also extending through a perforation or aperture provided in the spring 810a. It will be noted that the spring 810a is capable of pressing upon the nib without any interference on the part of the lever 812 by reason of the loose connection thereof to the loosely connected pin 817. When the lever 812 is depressed at the handle 815, the fork 816 draws upwardly upon a head of the pin 817 which in turn will draw by way of its other head, the spring 810a to release it from the nib. This may be done sufficiently to the extent of clearing the spring from the pin 806 so that the nib may be readily withdrawn. A new nib may then be inserted in place and the spring 810a permitted to return.

The process above described is carried out by the mechanisms above described, from a common operating shaft 820 carrying driving pulleys 821, 822, 823, 824 and 825 driving through belts 826, 827, 828, 829, and 830 to shift pulleys 831, 832, 833, 834 and 835 capable of operating counter shafts 836, 837, 838, 839 and 840. The countershaft 836 carries pulleys 841 and 842 adapted to drive through belts 843 and 846, the former of which is connected to and adapted to drive the pulley 58 and the latter of which is connected to and adapted to drive pulley 57 of the mechanism shown in Figs. 25 to 31 inclusive of the drawings. This mechanism is supported on a table or bench 847 shown in Fig. 96.

The countershaft 837 operates through pulleys 848 and 849 and belts 850 and 851 respectively connected to and driving pulleys 227 and 195 or 196 of the mechanism shown in Figs. 32 to 52 inclusive of the drawings.

The countershafts 838 carries driving pulleys 852 and 853 operating through belts 854 and 855 respectively connected to and adapted to drive pulleys 409 and 440 of the mechanism shown in Figs. 54 to 62 inclusive. It will be noted that the device for producing a notch in the rear end of the nib may be located on the bench between this machine and the previously noted machine as designated by the reference character 370 indicating the base of such notching device.

The countershaft 839 carries a driving pulley 856 driving through a belt 857 to the pulley 467 of the slitting mechanism shown in Figs. 63 to 69 inclusive of the drawings.

The countershaft 838 carries driving pulleys 858, 859 and 860 driving respectively through belts 861, 862 and 863 respectively connected to and driving pulleys 655, 668 and 605 or 606 of the finishing mechanism shown in Figs. 70 to 86 inclusive of the drawings.

In the previous description it was pointed out that the bases of the various machines comprised drain outlets 32, 173, 402, 452 and 597 for draining away fluids and foreign matter carried thereby, such as grit, particles of gold and the like. These drain outlets are shown in Fig. 96 and all lead into drain chutes 864 and 865 which are inclined to carry the material into a common collecting receptacle 866. This receptacle has a receiving compartment 867 in the bottom of which the heavy particles, particularly the particles of gold, may be collected and retrieved. The receptacle has a partition 868 which may be either imperforate, or perforate or reticulated. The liquid may flow either over or through it into a compartment 869 in which is located a pump 870 driven by a shaft 871 and a pulley 872 connected to the shaft. The pulley 872 may be driven in any suitable manner. The pump has a discharge pipe 873 leading to pipes 874 and 875 connected to distributing branches 876, 877, 878 and 879 to the respective machines. This liquid, which may be water or the like, is distributed to these machines for cooling effects and the like and will drain into the troughs of the machines and pass back through the drain outlet and into the collecting receptacle 866 carrying therewith the particles of gold or alloy and also particles of grit and the like.

While we have herein described and upon the drawings shown method and means of carrying out the process including novel means for the same, it is to be understood that the invention is not limited to the particular steps disclosed nor to the particular mechanisms shown and described, but that it also comprehends other process steps, features, details, arrangements of parts and constructions without departing from the spirit thereof.

Having thus disclosed the invention, we claim:

1. A device for operating on nibs, comprising a nib holder, means for moving the holder relative to an abrasive means to cause the point of the nib to move on the surface of the abrasive means, stop means for limiting the movement of said holder, counter-balancing means for moving the holder toward the stop means, and means for turning the holder whereby different parts of the nib may be operated upon by the abrasive means.

2. A device for operating on nibs, comprising a support, means for angularly moving the support, means for adjusting said moving means for varying the degree of movement of the support, a carrier on the support and adapted to angularly move on the support, a nib holder rotatably carried by said carrier, and means for rotating the holder.

3. A device for operating on nibs, comprising a support, means for angularly moving the support, a carrier on the support and adapted to angularly move on the support, a nib holder rotatably carried by said carrier, means for rotating the holder, and counter balance means for returning the carrier to normal position.

4. A device for operating on nibs, comprising a support, means for angularly moving the support, a carrier on the support and adapted to angularly move on the support, a nib holder rotatably carried by said carrier, means for rotating the holder, stop means on the support for limiting the movement of the carrier at normal position, and counter balance means for returning the carrier to normal position.

5. In a device for operating on nibs, driving means, means cooperative therewith for moving a nib along the surface of an abrasive means, means cooperative with said driving means for rotating said nib while moving the same, control means movably associated with said driving means, means for limiting the movement of said control means in one direction, means cooperative with said nib moving means for moving said control means in an opposite direction, and means controlled by said control means for stopping the operation of the device.

6. In a device for operating on nibs, driving means, means cooperative therewith for moving a nib along the surface of an abrasive means, means cooperative with said driving means for rotating said nib while moving the same, control means movably associated with said driving means, adjustable means adapted to be set at given timing position and for limiting the movement of said control means in one direction, means cooperative with said nib moving means for moving said control means in an opposite direction, and means controlled by said control means for terminating the operation of the device in time relation to said movement of said control means in said opposite direction.

7. In a device for operating on nibs, driving means, means cooperative therewith for moving a nib along the surface of an abrasive means, means cooperative with said driving means for rotating said nib while moving the same, control means movably associated with said driving means, means for limiting the movement of said control means at a given distance of movement thereof in one direction, means cooperative with said nib moving means for effecting an increment of movement of said control means away from said limiting means for each movement of said nib moving means, and means controlled by said control means after given increments of movement thereof for terminating the operation of the device.

In witness whereof, we hereunto subscribe our names to this specification.

JOHN E. WAHL.
CARL W. GRONEMANN.
ARTHUR N. LUNGREN.